(12) United States Patent
Roelse et al.

(10) Patent No.: US 9,317,668 B2
(45) Date of Patent: Apr. 19, 2016

(54) DYNAMIC TARDOS TRAITOR TRACING SCHEMES

(75) Inventors: Peter Roelse, Hoofddorp (NL); Jeroen Doumen, Hoofddorp (NL); Thijs Laarhoven, Hoofddorp (NL)

(73) Assignee: Irdeto B.V., Hoofddorp (NL)

( * ) Notice: Subject to any disclaimer, the term of this patent is extended or adjusted under 35 U.S.C. 154(b) by 0 days.

(21) Appl. No.: 14/126,913

(22) PCT Filed: May 2, 2012

(86) PCT No.: PCT/EP2012/058033
§ 371 (c)(1),
(2), (4) Date: Mar. 13, 2014

(87) PCT Pub. No.: WO2012/171712
PCT Pub. Date: Dec. 20, 2012

(65) Prior Publication Data
US 2015/0033026 A1  Jan. 29, 2015

(30) Foreign Application Priority Data

Jun. 17, 2011 (GB) .................. 1110254.8

(51) Int. Cl.
*G06F 21/16* (2013.01)
*G09C 5/00* (2006.01)
(Continued)

(52) U.S. Cl.
CPC ..... *G06F 21/16* (2013.01); *G09C 5/00* (2013.01); *H04L 9/00* (2013.01); *H04L 9/32* (2013.01); *G06F 2221/0748* (2013.01); *H04L 2209/606* (2013.01)

(58) Field of Classification Search
CPC ......................................... G06F 21/16
See application file for complete search history.

(56) References Cited

U.S. PATENT DOCUMENTS

| 2004/0098593 A1* | 5/2004 | Muratani ............ 713/176 |
| 2004/0111611 A1* | 6/2004 | Jin et al. ............ 713/163 |
| 2007/0165853 A1* | 7/2007 | Jin et al. ............ 380/210 |

(Continued)

FOREIGN PATENT DOCUMENTS

| EP | 2249507 A1 | 11/2010 |
| EP | 2461534 A1 | 6/2012 |
| EP | 2461564 A1 | 6/2012 |

OTHER PUBLICATIONS

Tamir Tassa, "Low Bandwidth Dynamic Traitor Tracing Schemes", Journal of Cryptology, 2005, vol. 18, No. 2, pp. 167-183.*

(Continued)

*Primary Examiner* — Jason K. Gee
*Assistant Examiner* — Zhimei Zhu
(74) *Attorney, Agent, or Firm* — Marc S. Kaufman; Amardeep S. Grewal; Reed Smith LLP

(57) ABSTRACT

A fingerprinting method. For each round in a series of rounds: providing to each receiver in a set of receivers a version of a source item of content, the source item of content corresponding to the round. For the round there is a corresponding part of a fingerprint-code for the receiver, the part includes one or more symbols. The version provided to the receiver represents those one or more symbols. One or more corresponding symbols are obtained from a suspect item as a corresponding part of a suspect-code. For each receiver in the set of receivers, a corresponding score that indicates a likelihood that the receiver is a colluding-receiver is updated.

17 Claims, 4 Drawing Sheets

(51) Int. Cl.
*H04L 9/00* (2006.01)
*H04L 9/32* (2006.01)

(56) References Cited

U.S. PATENT DOCUMENTS

| | | | | |
|---|---|---|---|---|
| 2009/0049560 | A1* | 2/2009 | Lotspiech | 726/32 |
| 2009/0183258 | A1* | 7/2009 | Isogai et al. | 726/22 |
| 2009/0320130 | A1* | 12/2009 | Jin et al. | 726/22 |
| 2009/0323936 | A1* | 12/2009 | Jin et al. | 380/36 |
| 2010/0043081 | A1* | 2/2010 | Kiayias et al. | 726/30 |
| 2010/0284530 | A1* | 11/2010 | Perez-Freire | H04L 9/32 380/1 |
| 2010/0287614 | A1* | 11/2010 | Perez-Freire et al. | 726/22 |
| 2012/0060223 | A1* | 3/2012 | Jin et al. | 726/26 |

OTHER PUBLICATIONS

Min Wu; Trappe, W.; Wang, Z.J.; Liu, K.J.R., "Collusion-resistant fingerprinting for multimedia," in Signal Processing Magazine, IEEE, vol. 21, No. 2, pp. 15-27, Mar. 2004.*

International Search Report and Written Opinion cited in corresponding International Application No. PCT/EP2012/058033 dated Aug. 13, 2012.

Stefan Katzenbeisser et al., "Combining Tardos Fingerprinting Code and Fingercasting", Information Hiding, [Lecture Notes in Computer Science]. Springer Berlin Heidelberg, Jun. 11, 2007.

Teddy Furon et al., "On the Design and Optimization of Tardos Probabilistic Fingerprinting Codes", Information Hiding,[Lecture Notes in Computer Science]. Springer Berlin Heidelberg, May 19, 2008.

Peter Roelse, "Dynamic Subtree Tracing and its application in pay-TV systems", International Journal of Information Security, vol. 10, No. 3, Jun. 1, 2011.

Gabor Tardos, "Optimal Probabilistic Fingerprint Codes", Renyi Institute, Hungarian Academy of Sciences, Budapest, Hungary, 2003.

Boris Skoric et al., "Symmetric Tardos Fingerprinting Codes for Arbitrary Alphabet Sizes", Springer Science +Business Media, LLC, 2007.

B. Skoric et al., "Tardos fingerprinting is better than we thought", 2008.

Oded Blayer et al., "Improved Versions of Tardos' Fingerprinting Scheme", Springer Science+Business Media, LLC 2008.

Antonio Simone et al., "Accusation Probabilities in Tardos codes: the Gaussian approximation is better than we thought", 2010.

Koji Nuida et al., "An improvement of discrete Tardos fingerprinting codes", Springer Science+Business Media, LLC. 2009.

Dan Boneh et al., "Collusion-Secure Fingerprinting for Digital Data", Department of Computer Science, Princeton University, 1998.

* cited by examiner

DYNAMIC TARDOS TRAITOR TRACING SCHEMES

This application claims priority to International Patent Application No. PCT/EP2012/058033, filed May 2, 2012, which claims priority to GB 1110254.8, filed Jun. 17, 2011, the disclosures of which are hereby incorporated by reference in its entirety.

FIELD OF THE INVENTION

The present invention relates to a fingerprinting method and an apparatus and computer program arranged to carry out the fingerprinting method.

BACKGROUND OF THE INVENTION

Digital watermarking of content is very well known. The content may comprise any type of information, and may include one or more of audio data, image data, video data, textual data, multimedia data, a web page, software products, security keys, experimental data or any other kind of data. There are many methods for performing digital watermarking of content but, in general, they all involve adding a watermark to an item of content. This involves embedding, or adding, watermark symbols (or a watermark codeword or payload data) into the original item of content to form a watermarked item of content. The watermarked item of content can then be distributed to one or more users (or recipients or receivers).

The method used for adding a watermark codeword to an item of content depends on the intended purpose of the watermark codeword. Some watermarking techniques are designed to be "robust", in the sense that the embedded watermark codeword can be successfully decoded even if the watermarked item of content has undergone subsequent processing (be that malicious or otherwise). Some watermarking techniques are designed to be "fragile", in the sense that the embedded watermark codeword cannot be successfully decoded if the watermarked item of content has undergone subsequent processing or modification. Some watermarking techniques are designed such that the difference between the original item of content and the watermarked item of content is substantially imperceptible to a human user (e.g. the original item of content and the watermarked item of content are visually and/or audibly indistinguishable to a human user). Other criteria for how a watermark is added to an item of content exist.

Digital forensic watermarking is increasingly being used to trace users who have "leaked" their content in an unauthorized manner (such as an unauthorized online distribution or publication of content). For this type of watermarking process, watermark codewords specific to each legitimate/authorized receiver are used. Each of the receivers receives a copy of the original item of content with their respective watermark codeword embedded therein. Then, if an unauthorized copy of the item of content is located, the watermark codeword can be decoded from that item of content and the receiver that corresponds to the decoded watermark codeword can be identified as the source of the leak.

However, even if we assume that the watermarking scheme itself is secure (i.e. the method by which the watermark codewords are embedded in the item of content and subsequently decoded is secure), there is still a powerful attack available against any digital forensic watermarking scheme: the so-called "collusion attack". In this type of attack, a number of users, each of whom has his own watermarked version of the item of content, form a coalition. As the watermarked versions are individually watermarked, and thus different, the coalition can spot the differences that arise from the individual watermarks in their collection of watermarked items of content. Thus, the coalition can create a forged copy of the item of content by combining bits and pieces from the various watermarked versions that they have access to. A good example of this would be by averaging these versions, or by interleaving pieces from the different versions.

Watermarking schemes alone cannot counter a collusion attack. Instead, the best way to withstand collusion attacks is by carefully selecting the sequences of watermark symbols that are used to form the watermark codewords that are then actually embedded and distributed. Such constructions are known in the literature as "traitor tracing schemes" or "fingerprinting schemes", and the watermark codewords are known as "fingerprint-codes" or sometimes simply "fingerprints". An important feature of such a scheme is the length of its fingerprint-codes, contrasted against the number of colluding users it can catch.

Various classes of traitor tracing schemes exist in the literature. One classification of traitor tracing schemes distinguishes between so-called "static" traitor tracing schemes and so-called "dynamic" traitor tracing schemes. For static traitor tracing schemes, it is assumed that the initial distributor of the watermarked items of content generates a single fingerprint-code for each receiver and distributes these to the receivers (as a watermark embedded within the item of content). Then, when the unauthorized copy (the "forgery") is found, a decoding/tracing algorithm is executed on that forgery to determine which receivers colluded to produce the forgery. This then ends the process. Static traitor tracing schemes are suitable for a single/one-off distribution of items of content (e.g. a single movie) to multiple receivers. In contrast, in a dynamic traitor tracing scheme, the distributor generates a fingerprint-code for each active/connected receiver and distributes the fingerprint-codes to these receivers (as a watermark embedded within an item of content). Then, when an unauthorized copy (the "forgery") is found, a decoding/tracing algorithm is executed on that forgery to try to identify one or more of the colluding receivers—if a member of the coalition is detected, then that receiver is deactivated/disconnected (in the sense that the receiver will receive no further watermarked items of content). Then, further fingerprint-codes are distributed to the remaining active/connected receivers (as a new watermark embedded within a new/subsequent item of content). The process continues in this way until all colluding receivers have been identified and disconnected. This may be viewed as operating over a series of rounds/stages, or at a series of time points, whereby at each stage the distributor will have more information on which to base his detection of colluding receivers and possibly eliminate one or more of those colluding receivers from subsequent rounds. This is suitable for scenarios in which a series of items of content are to be distributed to the population of receivers.

Another classification of traitor tracing schemes distinguishes between so-called "probabilistic" traitor tracing schemes and so-called "deterministic" traitor tracing schemes. A traitor tracing scheme is deterministic if, when the associated tracing algorithm identifies a receiver as being part of the coalition of receivers, then there is absolute certainty that that receiver's watermarked item of content was used to form the forgery. In contrast, a traitor tracing scheme is probabilistic if, when the associated tracing algorithm identifies a receiver as being part of the coalition of receivers, there is a non-zero probability (a so-called false positive probability) that that receiver's watermarked item of content was not actually used to form the forgery, i.e. that the receiver was not part of the coalition. A deterministic traitor tracing scheme will therefore never accuse any innocent receivers of helping to generate the forgery; a probabilistic traitor tracing scheme may accuse an innocent receiver of helping to generate the forgery, but this would happen with a small false positive probability.

A problem with deterministic traitor tracing schemes is that the size of the alphabet that is required is large—i.e. when generating the fingerprint-code for a receiver, each symbol in the fingerprint-code must be selectable from an alphabet made up of a large number of symbols. In general, watermarking schemes are more robust against forgery (e.g. by averaging different versions) if the alphabet size is small. It would therefore be desirable to have a fingerprinting scheme that makes use of a small (preferably binary) alphabet.

Current probabilistic static traitor tracing schemes can operate with a binary alphabet. However, current static traitor tracing schemes are only guaranteed to identify one of the colluding users, but not necessarily more or all of them. A solution is to iterate the scheme to identify all the colluding users, but this requires lengthy fingerprint-codes. It would be desirable to have a fingerprinting scheme that is guaranteed (at least with a certain probability) to identify all of the users who form the coalition generating forgeries and that has short fingerprint-codes.

Furthermore, current static traitor tracing schemes assume that the number of receivers who form the coalition is known beforehand (or at least an upper bound can be placed on this number). Then, when using static traitor tracing codes, this means that (in retrospect) often an unnecessarily long codeword has been used. For example, if only two people actually colluded, but one tailored the codeword to catch ten colluders, then the codewords and tracing time could be about 25 times longer than was actually necessary in that case.

Thus, current traitor tracing schemes are unable to trace any number of colluding receivers (i.e. a number that is unspecified in advance), with a small (i.e. practical) number of required watermarking symbols (i.e. a small alphabet), in a relatively short time with relatively short codewords, whilst ensuring that all the colluding receivers can be identified.

SUMMARY OF THE INVENTION

According to a first aspect of the invention, there is provided a fingerprinting method comprising, for each round in a series of rounds: providing to each receiver in a set of receivers a version of a source item of content, the source item of content corresponding to the round, wherein for the round there is a corresponding part of a fingerprint-code for the receiver, the part comprising one or more symbols, wherein the version provided to the receiver represents those one or more symbols; obtaining, from a suspect item of, content one or more corresponding symbols as a corresponding part of a suspect-code; for each receiver in the set of receivers, updating a corresponding score that indicates a likelihood that the receiver is a colluding-receiver, wherein a colluding-receiver is a receiver that has been provided with a version of a source item of content that has been used to generate a suspect item of content, wherein said updating is based on the fingerprint-code for the receiver and the suspect-code; for each receiver in the set of receivers, if the score for the receiver exceeds a threshold, updating the set of receivers by removing the receiver from the set of receivers so that the receiver is not provided with a further version of a source item of content, wherein the threshold is set such that the probability that a receiver that is not a colluding-receiver has a score exceeding the threshold is at most a predetermined probability.

In essence, this involves obtaining a dynamic (or at least semi-dynamic) probabilistic fingerprinting scheme by adapting static probabilistic fingerprinting schemes to the dynamic setting. This provides improved performance over existing dynamic probabilistic fingerprinting schemes, in terms of having a reduced number of required watermarking symbols (i.e. a small alphabet) whilst making use of shorter codewords. Moreover, embodiments are able to ensure that all the colluding receivers can be identified. As the method operates over a series of rounds and may identify colluding receivers at each round, the method may be terminated early, in that the method may be stopped once a particular number (or all) of the colluding receivers have been identified—i.e. the full length of (static) fingerprint-codes does not always need to be used and provided to receivers. In other words, colluding receivers may be detected earlier than otherwise possible, making use of fewer fingerprint symbols.

In some embodiments, each symbol assumes a symbol value from a predetermined set of symbol values, and the i-th symbol of the fingerprint-code for a receiver is generated as an independent random variable such that, for each symbol value in the predetermined set of symbol values, the probability that the i-th symbol of the fingerprint-code for a receiver assumes that symbol value is a corresponding probability value set for the i-th symbol position of the fingerprint-codes for the receivers.

If an obtained symbol corresponds to the i-th symbol position in the fingerprint-codes then updating the score for a receiver may comprise incrementing the score if that obtained symbol matches the i-th symbol in the fingerprint-code for that receiver and decrementing the score if that obtained symbol does not match the i-th symbol in the fingerprint-code for that receiver.

In some embodiments, each symbol assumes a symbol value from a predetermined set of symbol values, the predetermined set comprising only two symbol values. In particular, a binary symbol alphabet may be used. This is particularly useful as watermarking schemes are able to better handle situations in which only binary symbols (e.g. a 1 or a 0) need to be embedded—the watermarking may be made more robust and less noticeable.

In some embodiments, the probability that the i-th symbol of a fingerprint-code for a receiver assumes a first symbol value is $p_i$ and the probability that the i-th symbol of a fingerprint-code for a receiver assumes a second symbol value is $1-p_i$, and if an obtained symbol corresponds to the i-th symbol position in the fingerprint-codes then updating the score for a receiver may comprise incrementing the score by $\sqrt{(1-p_i)/p_i}$ if that obtained symbol is the first symbol value and the i-th symbol in the fingerprint-code for that receiver is the first symbol value and decrementing the score by $\sqrt{p_i/(1-p_i)}$ if that obtained symbol is the first symbol value and the i-th symbol in the fingerprint-code for that receiver is the second symbol value. Additionally, if an obtained symbol corresponds to the i-th symbol position in the fingerprint-codes then updating the score for a receiver may comprise incrementing the score by $\sqrt{p_i/(1-p_i)}$ if that obtained symbol is the second symbol value and the i-th symbol in the fingerprint-code for that receiver is the second symbol value and decrementing the score by $\sqrt{(1-p_i)/p_i}$ if that obtained symbol is the second symbol value and the i-th symbol in the fingerprint-code for that receiver is the first symbol value.

In some embodiments, the probability that the i-th symbol of a fingerprint-code for a receiver assumes a first symbol value is $p_i$ and the probability that the i-th symbol of a fingerprint-code for a receiver assumes a second symbol value is $1-p_i$, wherein the value $p_i$ is generated as an independent random variable having a probability density function of:

$$f(p) = \frac{1}{(\pi - 4\delta')\sqrt{p(1-p)}} \text{ for } \delta \leq p \leq (1-\delta)$$

wherein $\delta'=\arcsin(\sqrt{\delta})$ such that $0<\delta'<\pi/4$, $\delta=1/(\delta_c c)$, c is an expected number of colluding-receivers, and $\delta_c$ is a predetermined constant.

In some embodiments, each symbol for each fingerprint-code is generated independent of an expected number of colluding-receivers. This means that the fingerprinting scheme does not need to know in advance an estimate on the number of colluding receivers (or have some form of upper bound set on it)—instead, these embodiments can cater for scenarios in which any number of colluding receivers may participate in a coalition to generate unauthorized copies of content.

In such an embodiment, the probability that the i-th symbol of a fingerprint-code for a receiver assumes a first symbol value may be $p_i$ and the probability that the i-th symbol of a fingerprint-code for a receiver assumes a second symbol value may be $1-p_1$, where the value $p_i$ is generated as an independent random variable having a probability density function of:

$$f(p) = \frac{1}{\pi\sqrt{p(1-p)}} \text{ for } 0 < p < 1$$

In embodiments each symbol for each fingerprint-code is generated independent of an expected number of colluding-receivers, updating a score for a receiver may comprise, for one or more collusion-sizes, updating a score for the receiver for that collusion-size that indicates a likelihood that the receiver is a colluding-receiver under the assumption that the number of colluding-receivers is that collusion-size; and the method may then comprise, for each receiver in the set of receivers, if a corresponding score for that receiver exceeds a threshold corresponding to the collusion-size for that score, updating the set of receivers by removing that receiver from the set of receivers, wherein the thresholds are set such that the probability that a receiver that is not a colluding-receiver has a score exceeding the corresponding threshold is at most the predetermined probability.

Updating the score for a collusion-size may comprise disregarding a symbol obtained for the i-th position of the suspect-code if symbols generated for the i-th position of the fingerprint-codes are invalid for that collusion-size.

Symbols generated for the i-th position of the fingerprint-codes may be considered invalid for a collusion-size c if the generation of symbols for the i-th position of the fingerprint-codes independent of an expected number of colluding-receivers used a parameter value that would be inapplicable when generating symbols for the i-th position of fingerprint-codes dependent on an expected collusion-size of c.

Symbols for the i-th position of the fingerprint-codes may be considered invalid for a collusion-size of c if $p_i$ lies outside of the range $[\delta, 1-\delta]$, where $\delta=11/(\delta_c c)$ and $\delta_c$ is a predetermined constant.

In some embodiments, the method comprises generating a fingerprint-code for a receiver in advance of the series of rounds. Alternatively, in some embodiments, said providing comprises generating the part of the fingerprint-code for the receiver.

In some embodiments, the version of the source item of content provided to a receiver is formed by watermarking a copy of the source item of content with the part of the fingerprint-code for the receiver.

According to another aspect of the invention, there is provided an apparatus comprising a processor arranged to carry out a fingerprinting method, wherein the method comprises, for each round in a series of rounds: providing to each receiver in a set of receivers a version of a source item of content, the source item of content corresponding to the round, wherein for the round there is a corresponding part of a fingerprint-code for the receiver, the part comprising one or more symbols, wherein the version provided to the receiver represents those one or more symbols; obtaining, from a suspect item of content one or more corresponding symbols as a corresponding part of a suspect-code; for each receiver in the set of receivers, updating a corresponding score that indicates a likelihood that the receiver is a colluding-receiver, wherein a colluding-receiver is a receiver that has been provided with a version of a source item of content that has been used to generate a suspect item of content, wherein said updating is based on the fingerprint-code for the receiver and the suspect-code; for each receiver in the set of receivers, if the score for the receiver exceeds a threshold, updating the set of receivers by removing the receiver from the set of receivers so that the receiver is not provided with a further version of a source item of content, wherein the threshold is set such that the probability that a receiver that is not a colluding-receiver has a score exceeding the threshold is at most a predetermined probability.

According to another aspect of the invention, there is provided a computer program which, when executed by a processor, causes the processor to carry out a fingerprinting method comprising, for each round in a series of rounds: providing to each receiver in a set of receivers a version of a source item of content, the source item of content corresponding to the round, wherein for the round there is a corresponding part of a fingerprint-code for the receiver, the part comprising one or more symbols, wherein the version provided to the receiver represents those one or more symbols; obtaining, from a suspect item of content one or more corresponding symbols as a corresponding part of a suspect-code; for each receiver in the set of receivers, updating a corresponding score that indicates a likelihood that the receiver is a colluding-receiver, wherein a colluding-receiver is a receiver that has been provided with a version of a source item of content that has been used to generate a suspect item of content, wherein said updating is based on the fingerprint-code for the receiver and the suspect-code; for each receiver in the set of receivers, if the score for the receiver exceeds a threshold, updating the set of receivers by removing the receiver from the set of receivers so that the receiver is not provided with a further version of a source item of content, wherein the threshold is set such that the probability that a receiver that is not a colluding-receiver has a score exceeding the threshold is at most a predetermined probability.

The computer program may be carried on a data carrying medium.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

Figure 1:
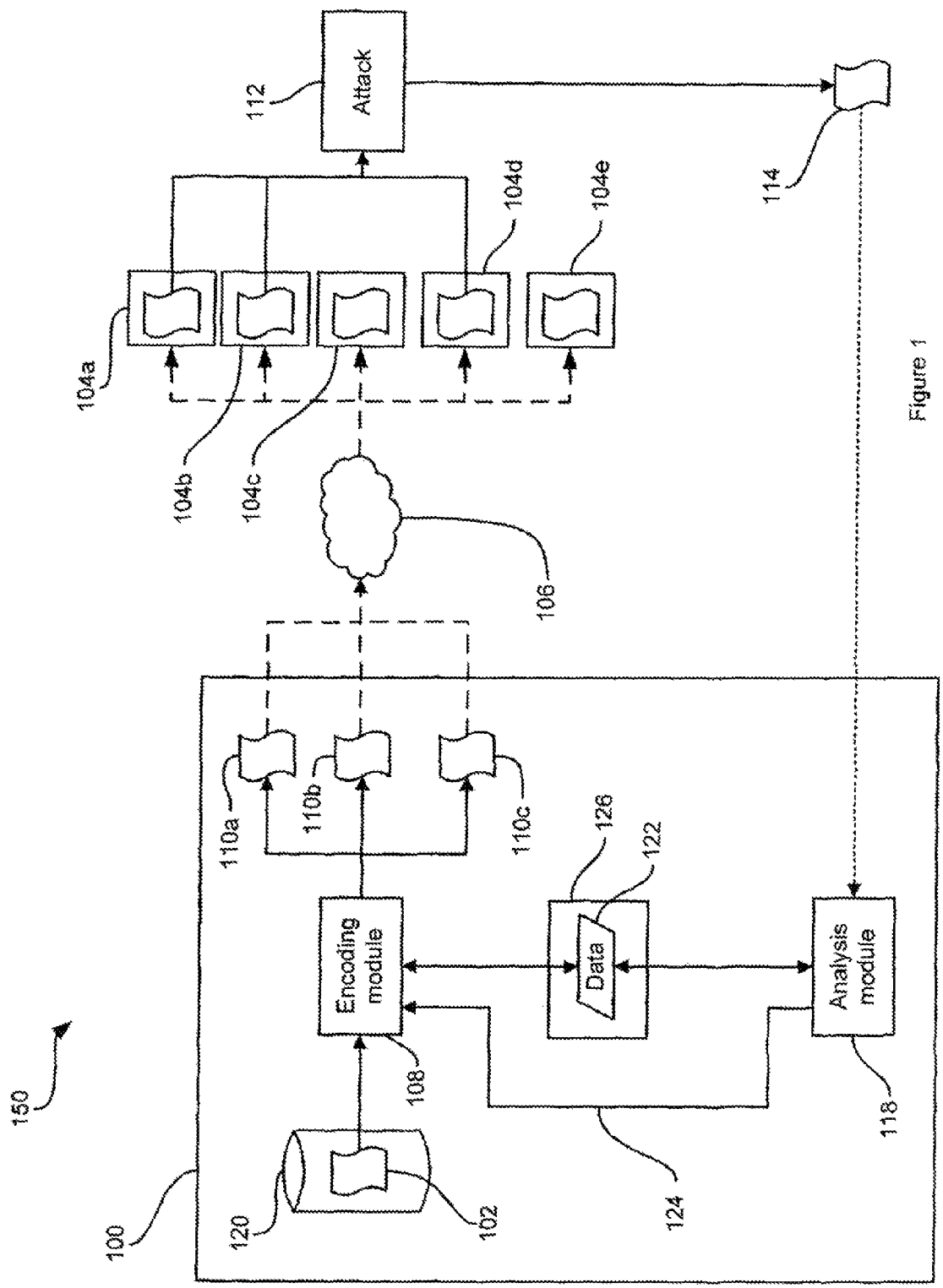
FIG. 1 schematically illustrates an overview of a fingerprinting (or traitor tracing) system/scheme according to an embodiment of the invention.

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.
System Overview FIG. 1 schematically illustrates an overview of a fingerprinting (or traitor tracing) system/scheme 150 according to an embodiment of the invention.

It will be useful, first, to provide a high-level summary of the operation of the fingerprinting scheme 150 before discussing the various components in more detail. The system 150 comprises a content distributor 100 and a plurality of receivers 104 (shown in FIG. 1 as receivers 104a-104e). The content distributor 100 has one or more items of content 102 for distribution to the plurality of receivers 104. As will be discussed later, each of the receivers 104 that is to receive a copy of the item of content 102 will have its own respective assigned fingerprint-code, where a fingerprint-code is a sequence or series of symbols that are taken from some symbol alphabet (the alphabet is a predetermined set of symbol values). As will become apparent later, embodiments of the invention concern managing the generation and use of fingerprint-codes.

The content distributor 100 comprises an encoding module 108 that is arranged to generate different versions (or copies) of items of content 110 (shown in FIG. 1 as items of content 110a-110c). Each generated version of an item of content 110 corresponds to a sequence of one or more fingerprint symbols. For example, the encoding module 108 may generate a version of an item of content 110 by embedding a sequence of one or more fingerprint symbols into a copy of the original item of content 102 using a watermarking encoding method—in this case, the sequence that has been embedded into the original item of content 102 to form one watermarked item of content 110 is different from the sequence that has been embedded in the original item of content 102 to form another watermarked item of content 110 and the watermarked items of content 110 are therefore different versions of the original item of content 102. Embodiments of the invention will be described below in which the encoding module 108 generates a version of an item of content 110 from a source item of content 102 by embedding a watermark representing a sequence of one or more symbols, and the versions shall therefore be referred to as watermarked items of content 110. However, it will be appreciated that other embodiments of the invention may make use of other methods of generating different versions and that, in general, each copy 110 is simply a particular version of the original item of content 102 that corresponds to a particular sequence of one or more fingerprint symbols or, put another way, each copy 110 is a modified version of the original item of content 102 where the modification represents a corresponding sequence of one or more fingerprint symbols.

The content distributor 100 then provides the watermarked items of content 110 to the respective receivers 104. This is carried out so that the watermarked item of content 110 provided to a particular receiver 104 has embedded therein (or at least corresponds to or represents) a sequence of fingerprint symbols that form at least a corresponding part of the fingerprint-code for that particular receiver 104.

An attack 112 may be carried out to generate a new item of content 114, which is a version of the original item of content 102. This new item of content shall be referred to, herein, as a "forgery" 114. The forgery 114 may be generated from (or based on) a single watermarked item of content 110 received by a receiver 110. Alternatively, the forgery 114 may generated from (or based on) two or more of the watermarked items of content 110 received by the receivers 104, in which case the attack comprises a so-called "collusion attack"—in FIG. 1, the forgery 114 is generated from the watermarked items of content 110 received by receivers 104a, 104b and 104d. Whilst a coalition of three colluding receivers 104 is illustrated in FIG. 1, it will be appreciated that a coalition may be formed from any other number of receivers 104. The receivers 104 whose received watermarked items of content 110 are used to create the forgery 114 shall be referred to, herein, as "pirates" 104.

The content distributor 100 may then receive, or somehow obtain, a copy of the forgery 114. The content distributor 100 also comprises an analysis module 118. The content distributor 100 uses the analysis module 118 to determine a sequence of one or more fingerprint symbols that corresponds to the received forgery 114. This processing is, essentially, an inverse operation to the method by which the encoding module generates a version 110 of a source item of content 102 that corresponds to a sequence of one or more fingerprint symbols. For example, the content distributor 100 may use a watermark decoding operation corresponding to the inverse of a watermark embedding operation carried out by the encoding module 108. The sequence of one or more fingerprint symbols that the analysis module 118 identifies as corresponding to (or having been embedded within) the received forgery 114 are used to form a suspect-code (or a part thereof). The analysis module 118 then uses the suspect-code to try to identify pirates 104, i.e. to identify which receivers 104 out of the plurality of receivers 104 were part of the coalition and received watermarked items of content 110 that were used (at least in part) to create the forgery 114.

The content distributor 100 may then distribute a further item of content 102, with different fingerprint symbols embedded therein, to the receivers 104 in the same way as set out above.

For static fingerprinting or traitor tracing schemes, the generation of fingerprint-codes and the provision of watermarked items of content 110 to receivers 104 does not depend on the results of the processing performed by the analysis module 118. In contrast, for dynamic fingerprinting or traitor tracing schemes, the generation of fingerprint-codes and the provision of watermarked items of content 110 to receivers 104 does depend on the results of the processing performed by the analysis module 118. As will be discussed in more detail below, in embodiments of the invention, once a receiver 104 has been identified as a pirate 104 by the analysis module 118, then the content distributor 100 may stop providing that pirate 104 with items of content 102 (or watermarked items of content 110), i.e. fingerprint-codes need no longer be generated for, and provided to, the identified pirates 104. This information from the analysis module 118 is illustrated as being provided as feedback 124 to the encoding module 108. Whilst embodiments of the invention will make use of this feedback 124, the system 150 illustrated in FIG. 1 is useful for understanding static fingerprinting or traitor tracing schemes (in which case the feedback 124 would not be present).

The item of content 102 may comprise any type of information, and may include one or more of audio data, image data, video data, textual data, multimedia data, a web page, software products, security keys, experimental data or any other kind of data which the content distributor 100 wishes to provide (or transmit or communicate or make available) to the receivers 104. Indeed, the item of content 102 may be any unit or amount of content. For example, the content distributor 100 may store video data for a movie, and each item of content 102 could comprise a number of video frames from the movie.

The content distributor 100 may be any entity arranged to distribute content to receivers 104. The content distributor 100 may have a database 120 of items of content 102, such as a repository of audio and video files. Additionally or alternatively, the content distributor 100 may generate the items of content 102 as and when required—for example, the items of content 102 may be decryption keys or conditional access information for decrypting or accessing segments of video, and these decryption keys or conditional access information may be generated as and when the segments of video are provided to the receivers 104, so that storage of the decryption keys or conditional access information in a database 120 may be unnecessary. Additionally or alternatively, the content distributor 100 may not necessarily be the original source of the items of content 102 but may, instead, receive the items of content 102 from a third party and may store and/or distribute those items of content 102 on behalf of the third party.

The content distributor 100 may comprise one or more computer systems, examples of which will be described later with reference to FIG. 4. The encoding module 108 and/or the analysis module 118 may be implemented in hardware, for example with one or more application specific integrated circuits (ASICs) and/or with one more or more field programmable gate arrays (FPGAs) and/or with one or more digital signal processors (DSPs) and/or with other types of hardware device. Additionally or alternatively, one or both of these modules may be implemented using one or more software modules and/or firmware modules, with the content distributor 100 storing corresponding computer programs in a memory 126 for subsequent loading and execution by a processor.

In FIG. 1, the content distributor 100 is shown as a unitary entity comprising both the encoding module 108 and the analysis module 118, but it will be appreciated that other configurations are possible. For example, the encoding module 108 and the analysis module 118 may be organised as parts of separate entities/systems, potentially operated by separate people/organizations. It will be appreciated that other configurations for the content distributor 100 are possible and that this is not important for implementing embodiments of the invention.

The encoding module 108 may need to make use of various configuration parameters and/or other data in order to carry out its processing. These configuration parameters and/or other data are illustrated in FIG. 1 as a part of data 122. The data 122 may be stored in the memory 126 of the content distributor 100. Some of these configuration parameters and/or other data may be predetermined (e.g. various constants) and the encoding module 108 may therefore be configured to read these data from the memory 126; other configuration parameters and/or other data may be generated by the encoding module 108 as part of its processing and the encoding module 108 may therefore be configured to write these data to the memory 126 for storage, in case these data are needed later on. Similarly, the analysis module 118 may need to make use of some or all of the configuration parameters and/or other data used by the encoding module 108 or, indeed, other configuration parameters and/or other data. The configuration parameters and/or other data used by the analysis module 118 are also shown in FIG. 1 as a part of the data 122. Again, some of these configuration parameters and/or other data may be predetermined (e.g. various constants) and the analysis module 118 may therefore be configured to read these data from the memory 126; other configuration parameters and/or other data may be generated by the analysis module 118 as part of its processing and the analysis module 118 may therefore be configured to write these data to the memory 126 for storage, in case these data are needed later on.

The encoding module 108 may embed symbols of a fingerprint-code into the item of content 102 by making use of any watermarking embedding technique. Such watermark embedding techniques are well-known in this field of technology. The particular choice of watermark embedding technique is not essential for carrying out embodiments of the invention, and, as the skilled person will be familiar with various watermarking embedding techniques, such techniques shall not be described in any detail herein. However, in preferred embodiments of the invention, the watermark embedding technique is capable of encoding a watermark codeword within the item of content 102 in a robust manner, so that the embedded watermark codeword is decodable from a watermarked item of content 110 even after various processing has been applied to the watermarked item of content 110, whether that is non-malicious processing (such as data compression for the purposes of transmitting the watermarked item of content 110 to the receiver 104 or the addition of noise/errors due to the transmission of the watermarked item of content 110 to the receiver 104) or malicious processing (in which modifications are deliberately made to the watermarked item of content 110 in order to try to make the embedded watermark codeword not decodable or, at the very least, more difficult to decode). Similarly, the analysis module 118 may decode symbols of an embedded fingerprint-code from an item of content by making use of any corresponding watermarking decoding technique, as are well-known in this field of technology. Again, we shall not describe such decoding techniques in any detail herein as the particular choice of watermark decoding technique is not essential for carrying out embodiments of the invention and the skilled person will be familiar with various watermarking decoding techniques.

The watermarked items of content 110 may be provided to the receivers 104 in a number of ways. For example, the content distributor 100 may transmit (or send or communicate) the watermarked items of content 110 to the receivers 104 via one or more networks 106, which may be one or more of the internet, wide area networks, local area networks, metropolitan area networks, wireless networks, broadcast networks, telephone networks, cable networks, satellite networks, etc. Any suitable communication protocols may be used. Additionally or alternatively, the content distributor 100 may store the watermarked items of content 110 so that the receivers 104 can contact the content distributor 100 and access watermarked items of content 110 directly from the content distributor 100. For example, the content distributor 100 could comprise a server storing the various watermarked items of content 110, and the content distributor could host a website with functionality to enable the receivers 104 to download watermarked items of content 110 from the server—in such a scenario, the content distributor 100 may generate the watermarked item of content 110 for a particular receiver 104 as and when that receiver 104 contacts the website to request and download a copy of the item of content 102. The watermarked items of content 110 may be provided to the receivers 104 as a single item of data (e.g. as a downloaded item of content) or they may be streamed to the receivers 104 (such as online video or audio streaming or video and audio broadcasting). Additionally or alternatively, watermarked items of content 110 may be provided to receivers via one or more physical media, such as data stored on a CD, a DVD, a BluRay disc, etc. Hence, the particular method by which the receivers 104 are provided with watermarked items of content 110 is not important for embodiments of the invention, and this provision is therefore shown generally by dashed lines in FIG. 1.

The receivers 104 may be any device (or client or subscriber system) capable of receiving items of content from the content distributor 100 (and to whom the content distributor 100 initially wishes to provide items of content). For example, a receiver may be a personal computer, a set-top box, a mobile telephone, a portable computer, etc. Examples of such data processing systems will be described later with reference to FIG. 4. A human user may have one or more receivers 104 and so, in theory, a coalition of receivers 104 may be formed by a single human user (so that the collusion attack is carried out by a single human user who has access to multiple different receivers 104). Whilst FIG. 1 illustrates there being five receivers 104*a-e*, it will be appreciated that there may be any number of receivers 104 and that, in practice, the number of receivers 104 may be significantly larger.

The attack 112 performed to generate the forgery 114 may be any form of attack. Indeed, the forgery 114 may be an exact copy of a single watermarked item of content 110 that has been provided to a pirate 104 (so that the attack 112 may be seen as a "null" attack). However, the attack 112 may involve carrying out various processing on the watermarked item(s) of content 110 that are used to generate the forgery 114—this processing could include, for example, one or more of: data compression; addition of noise; geometric and/or temporal and/or frequency transformations; deletion/removal of parts of the watermarked items of content 110; or other such processing.

If multiple pirates 104 are involved in the generation of the forgery 114, then the attack 112 is a collusion attack. The collusion attack 112 performed using the watermarked items of content 110 that the colluding receivers (i.e. pirates 104*a*, 104*b* and 104*d* in FIG. 1) have received may be any type of collusion attack 112. One possible attack is to average the respective watermarked items of content 110 of the colluding receivers 104 to form the forgery 114. Another possible attack is to form various parts of the forgery 114 by copying in corresponding parts from one of the colluding receiver's watermarked items of content 110. This may be seen as a simple form of weighted average of the respective watermarked items of content 110 of the colluding receivers 104 to form the forgery 114; other weighted averages or other weighted combinations of the respective watermarked items of content 110 of the colluding receivers 104 could be used instead. Indeed, other kinds of collusion attack 112 (either known now or developed in the future) could be used by the coalition.

The content distributor 100 may obtain the forgery 114 in a number of ways, such as by finding the forgery 114 at a location on a network, being sent a copy by a third party, etc. The exact manner is not important for embodiments of the invention and therefore this is illustrated in FIG. 1 simply as a dotted line.

It will be appreciated that various modifications may be made to the system shown in FIG. 1. For example, the content distributor 100 may provide the original item of content 102 to the receiver 104 as an encrypted (scrambled) item of content. The receiver 104 may then decrypt (descramble) the encrypted item of content and this decryption process may be arranged so that symbols of the fingerprint-code for the receiver 104 are embedded into the item of content 102 during the decryption process. In this way, the receiver 104 may comprise, and carry out, the watermark embedding functionality of the encoding module 108 instead of the content distributor 100. The content distributor 100 may still operate its own encoding module 108 to generate fingerprint-code symbols for the receivers 104 and provide those generated symbols to the receivers 104 in encrypted form along with the encrypted item of content 102, so that these symbols may be embedded when the receiver 104 performs the decryption process (or otherwise interacts with or accesses the encrypted item of content 102) to form the watermarked item of content 110 for the receiver 104. Alternatively, the receiver 104 may be arranged itself to generate symbols for the fingerprint-code for that receiver 104, instead of the encoding module 108—in this case, when the receiver 104 decrypts the received encrypted item of content 102 (or otherwise interacts with or accesses the encrypted item of content 102), the decryption process may be arranged to both generate symbols of the fingerprint-code for the receiver 104 and embed those symbols into the decrypted item of content 102 to form the watermarked item of content 110 for the receiver 104. In an alternative embodiment, the content distributor 100 generates and encrypts the watermarked items of content 110, where each watermarked item of content 110 is encrypted using a key specific to that watermarked item of content 110. The content distributor 100 may then send all of the encrypted watermarked items of content 110 to each receiver 104. In this case, the content distributor 100 may provide each receiver 104 with a decryption key for just one of the encrypted watermarked items of content 110, so that the receiver 104 can access only one of the watermarked items of content 110—this provides an alternative way of providing a specific watermarked item of content 110 to a receiver 104.

It will therefore be appreciated that embodiments of the invention may operate in a variety of ways with different components of the system being implemented in different ways and, potentially, by different entities (content distributor 100, receivers 104, etc.) within the system.

Notation

In the rest of this description, the following notation shall be used:

For the j-th receiver 104, the fingerprint-code for that receiver is $\vec{x}_j$, so that the i-th symbol for the fingerprint-code for the j-th receiver is $x_{j,i}$.

The analysis module 118 generates a suspect-code $\vec{y}$ from one or more forgeries 114 that the content distributor 100 receives. The i-th symbol of the suspect-code is $y_i$.

The number of receivers 104 shall be represented by the symbol n.

Example Static Probabilistic Fingerprinting or Traitor Tracing Schemes

Before describing embodiments of the invention that relate to dynamic (or semi-dynamic) fingerprinting schemes (i.e. in which the system 150 makes use of the feedback 124 shown in FIG. 1), it will be helpful to first discuss a couple of static probabilistic fingerprinting schemes.

A first "Tardos" fingerprinting scheme (referred to in the following as TAR1) is disclosed in "*Optimal Probabilistic Fingerprint-codes*" (Gabor Tardos, STOC'03: Proceedings of the thirty fifth annual ACM symposium on Theory of computing, 2003, pages 116-125). The TAR1 scheme operates as follows:

(a) Let the value $c \geq 2$ be an integer representing the maximum coalition size that the fingerprinting scheme is to cater for (i.e. the maximum number of pirates 104 who can generate a forgery 114). Let $\epsilon_1 \in (0,1)$ be a desired upper bound on the probability of incorrectly identifying a receiver 104 as being a pirate 104, i.e. a false positive probability for the fingerprinting scheme.

(b) Set the length, l, of each receiver's 104 fingerprint-code to be $l=100c^2k$, where $k = \lceil \log(n/\epsilon_1) \rceil$, so that $\vec{x}_j = (x_{j,1}, x_{j,2}, \ldots, x_{j,l})$. Set $\delta = 1/(300c)$. Set $Z=20ck$. Set $\delta' \arcsin(\sqrt{\delta})$ such that $0 < \delta' < \pi/4$.

(c) For each $i=1, \ldots, l$ choose a value $p_i$ independently from the range $[\delta, 1-\delta]$ according to a distribution with probability density function $$f(p) = \frac{1}{(\pi - 4\delta')\sqrt{p(1-p)}} \text{ for } \delta \leq p \leq (1-\delta).$$

(d) For each $i=1, \ldots, l$ and for each $j=1, \ldots, n$, the i-th symbol in the fingerprint-code for the j-th receiver 104 (i.e. $x_{j,i}$) is generated as an independent random variable such that $P(x_{j,i}=1)=p_i$ and $P(x_{j,i}=0)=1-p_i$, i.e. the probability that $x_{j,i}$ assumes a first predetermined value is $p_i$ and the probability that $x_{j,i}$ assumes a second predetermined value is $1-p_i$. Such an independent random variable is often referred to as a Bernoulli random variable (or as having a Bernoulli distribution), and may be represented by the notation: $\text{Ber}(p_i)$. The values 1 and 0 are used here for the first and second predetermined symbol values, but it will be appreciated that other symbol values could be used instead.

(e) Having received a suspect-code $\vec{y}$, then for each $j=1, \ldots, n$, a score $S_j$ for the j-th receiver 104 is calculated according to $$S_j = \sum_{i=1}^{l} S_{j,i},$$

where $$S_{j,i} = \begin{cases} g_1(p_i) & \text{if } x_{j,i}=1 \text{ and } y_i=1 \\ g_0(p_i) & \text{if } x_{j,i}=0 \text{ and } y_i=1 \\ 0 & \text{if } y_i=0 \end{cases}$$

where $g_0(p) = -\sqrt{p/(1-p)}$ and $g_1(p) = \sqrt{(1-p)/p}$.

(f) For each receiver 104, identify (or accuse) that receiver 104 as being a pirate 104 if that receiver's score exceeds the threshold value Z, i.e. the j-th receiver 104 is accused of being a pirate 104 if $S_j > Z$.

With this scheme, the probability of incorrectly identifying a receiver 104 as being a pirate 104 (i.e. the false positive probability) is at most $\epsilon_1$, whilst the probability of not managing to identify any pirates 104 at all (which can be seen as a first type of false negative probability) is at most $\epsilon_2 = (\epsilon_1/n)^{\sqrt{c}/4}$.

A modified Tardos fingerprinting scheme (referred to in the following as TAR2) is disclosed in "*Symmetric Tardos Fingerprinting Codes for Arbitrary Alphabet Sizes*" (Boris Skoric et al., Des. Code Cryptography, 46(2), 2008, pages 137-166). The TAR2 scheme operates in the same way as the TAR1 scheme except that $S_{j,i}$ is defined as:

$$S_{j,i} = \begin{cases} g_1(p_i) & \text{if } x_{j,i}=1 \text{ and } y_i=1 \\ g_0(p_i) & \text{if } x_{j,i}=0 \text{ and } y_i=1 \\ g_0(1-p_i) & \text{if } x_{j,i}=1 \text{ and } y_i=0 \\ g_1(1-p_i) & \text{if } x_{j,i}=0 \text{ and } y_i=0 \end{cases}$$

With the TAR2 scheme, the length of the fingerprint-codes, l, can be 4 times smaller than that stipulated in the TAR1 scheme whilst maintaining the above false positive and false negative probabilities.

This document also considers symbol alphabets of size greater than 2 (i.e. non-binary alphabets), i.e. it discloses how Tardos-based fingerprinting schemes may be implemented using a non-binary symbol alphabet. In particular, a symbol alphabet of size q may be used, so that the symbol alphabet may be, for example $\{v_1, \ldots, v_q\}$. Then, for each $i=1, \ldots, l$ and for each $j=1, \ldots, n$, the i-th symbol in the fingerprint-code for the j-th receiver 104 (i.e. $x_{j,i}$) may be generated as an independent random variable such that $P(x_{j,i}=v_1)=p_{i,1}, \ldots, P(x_{j,i}=v_q)=p_{i,q}$ for values $p_{i,1}, p_{i,2}, \ldots, p_{i,q}$, i.e. the probability that the i-th symbol assumes the k-th symbol value in the symbol alphabet is $p_{i,k}$ (for $k=1, \ldots q$). For each $i=1, \ldots, l$, the values $p_{i,1}, \ldots, p_{i,q}$ may be chosen for the i-th symbol position independently according to a distribution which may be, for example, a Dirichlet distribution. This paper then discusses how the scores $S_{j,i}$ and the threshold Z should be adapted accordingly.

A further modified Tardos fingerprinting scheme (referred to in the following as TAR3) is disclosed in "*Tardos Fingerprinting is better than we thought*" (Boris Skoric et al., CoRR, abs/cs/0607131, 2006) which focuses on finding improvements for the parameters l, $\delta$ and Z A further modified Tardos fingerprinting scheme (referred to in the following as TAR4) is disclosed in "*Improved versions of Tardos' fingerprinting scheme*" (Oded Blayer et al., Des. Codes Cryptography, 48, pages 79-103, 2008) which also focuses on finding improvements for the parameters l, $\delta$ and Z.

A further modified Tardos fingerprinting scheme (referred to in the following as TAR5) is disclosed in "*Accusation Probabilities in Tardos Codes: the Gaussian Approximation is better than we thought*" (Antonino Simone et al., Cryptology ePrint Archive, Report 2010/472, 2010).

A further modified Tardos fingerprinting scheme (referred to in the following as TAR6) is disclosed in "*An Improvement of Discrete Tardos Fingerprinting Codes*" (Koji Nuida et al., Designs, Codes and Cryptography, 52, pages 339-362, 2009), which focuses on optimizing l (and Z), for small predetermined values of c, by constructing different probability distributions f(p).

A further modified Tardos fingerprinting scheme (referred to in the following as TART) operates as follows:

(a) Let the value $c \geq 2$ be an integer representing the maximum coalition size that the fingerprinting scheme is to cater for (i.e. the maximum number of pirates 104 who can generate a forgery 114). Let $\epsilon_1 \epsilon (0,1)$ be a desired upper bound on the probability of incorrectly identifying a receiver 104 as being a pirate 104, i.e. a false positive probability for the fingerprinting scheme.

(b) Let $d_\alpha$, r, s and g be positive constants with $r > \frac{1}{2}$ and let $d_l$, $d_z$, $d_\delta$, $d_\alpha$, r, s, g and $\eta$ be values satisfying the following four requirements:

$$d_\alpha \geq \frac{\sqrt{d_\delta}}{h(r)\sqrt{c}}$$

$$\frac{d_z}{d_\alpha} - \frac{rd_l}{d_\alpha^2} \geq 1$$

$$\frac{2 - (4/d_\delta)}{\pi} - \frac{h^{-1}(s)s}{\sqrt{d_\delta c}} \geq g$$

$$gd_l - d_z \geq \eta \sqrt{\frac{d_\delta}{s^2 c}}$$

where $h^{-1}$ is a function mapping from $(\frac{1}{2}, \infty)$ to $(0, \infty)$ according to $h^{-1}(x) = (e^x - 1 - x)/x^2$, and h is the inverse function mapping from $(0, \infty)$ to $(\frac{1}{2}, \infty)$.

(c) Set the length, l, of each receiver's 104 fingerprint-code to be $l = d_l c^2 k$, where $k = \lceil \log(n/\epsilon_1) \rceil$. Set $\delta = 1/(d_\delta c)$. Set $Z = d_z ck$. Set $\delta' = \arcsin(\sqrt{\delta})$ such that $0 < \delta' < \pi/4$.

(d) For each $i = 1, \ldots, l$ choose a value $p_i$ independently from the range $[\delta, 1-\delta]$ according to a distribution with probability density function $$f(p) = \frac{1}{(\pi - 4\delta')\sqrt{p(1-p)}} \text{ for } \delta \leq p \leq (1-\delta).$$

(e) For each $i = 1, \ldots, l$ and for each $j = 1, \ldots, n$, the i-th symbol in the fingerprint-code for the j-th receiver 104 (i.e. $x_{j,i}$) is generated as an independent random variable such that $P(x_{j,i} = 1) = p_i$ and $P(x_{j,i} = 0) = 1 - p_i$, i.e. the probability that $x_{j,i}$ assumes a first predetermined value is $p_i$ and the probability that $x_{j,i}$ assumes a second predetermined value is $1 - p_i$. Again, the values 1 and 0 are used here for the first and second predetermined symbol values, but it will be appreciated that other symbol values could be used instead.

(f) Having received a suspect-code $\vec{y}$, then for each $j = 1, \ldots, n$, a score $S_j$ for the j-th receiver 104 is calculated according to $$S_j = \sum_{i=1}^{l} S_{j,i},$$

where $$S_{j,i} = \begin{cases} g_1(p_i) & \text{if } x_{j,i} = 1 \text{ and } y_i = 1 \\ g_0(p_i) & \text{if } x_{j,i} = 0 \text{ and } y_i = 1 \\ g_0(1-p_i) & \text{if } x_{j,i} = 1 \text{ and } y_i = 0 \\ g_1(1-p_i) & \text{if } x_{j,i} = 0 \text{ and } y_i = 0 \end{cases}$$

where $g_0(p) = -\sqrt{p/(1-p)}$ and $g_1(p) = \sqrt{(1-p)/p}$.

(g) For each receiver 104, identify (or accuse) that receiver 104 as being a pirate 104 if that receiver's score exceeds the threshold value Z, i.e. the j-th receiver 104 is accused of being a pirate 104 if $S_j > Z$.

With this scheme, the probability of incorrectly identifying a receiver 104 as being a pirate (i.e. the false positive probability) is at most $\epsilon_1$, whilst the probability of not managing to identify any pirates 104 at all (i.e. the first type of false negative probability) is again at most $\epsilon_2$. The mathematical proofs of these false positive and false negative results are provided in chapters 8.3 and 8.4 of the appendix at the end of this description (which form part of a thesis "*Collusion-resistant traitor tracing schemes*" by Thijs Martinus Maria Laarhoven, to be submitted to the Department of Mathematics and Computer Science, University of Technology, Eindhoven).

Other static probabilistic fingerprinting schemes exist (with binary and/or non-binary symbol alphabets), such as the one described in "*Collusion-Secure Fingerprinting for Digital Data*" (Dan Boneh et al., IEEE Transactions on Information Theory, pages 452-465, 1998)—referred to below as BER1.

All of these static probabilistic fingerprinting schemes operate as follows. For each receiver 104, the symbols for the entire fingerprint-code for that receiver are generated and the receiver 104 is then provided with the entire fingerprint-code (as has been described above with reference to FIG. 1). These fingerprint-codes are embedded as watermark payloads within items of content 102 for the receivers 104. Thus, the number of watermarked items of content 110 generated would have to be sufficient to provide each receiver 104 with its own specific watermarked item of content 110. When a forgery 114 is located, a suspect-code is extracted from the forgery by a watermarked decoding operation. The suspect-code is then compared against each receiver's 104 fingerprint-code (using the appropriate tracing schemes set out above). Based on these comparisons, a receiver 104 may be accused of being a pirate 104 who participated in the generation of the forgery 114. Subsequent items of content 102 may be distributed to the receivers 104, and when this is done, new fingerprint-codes are generated and provided to the receivers 104 accordingly, as set out above. However, this does not make use of any feedback 124 shown in the system 150 of FIG. 1.

Probabilistic Fingerprinting Schemes Using Feedback

As mentioned above, embodiments of the invention provide probabilistic fingerprinting schemes that make use of the feedback loop 124 of the system 150 illustrated in FIG. 1.

Figure 2:
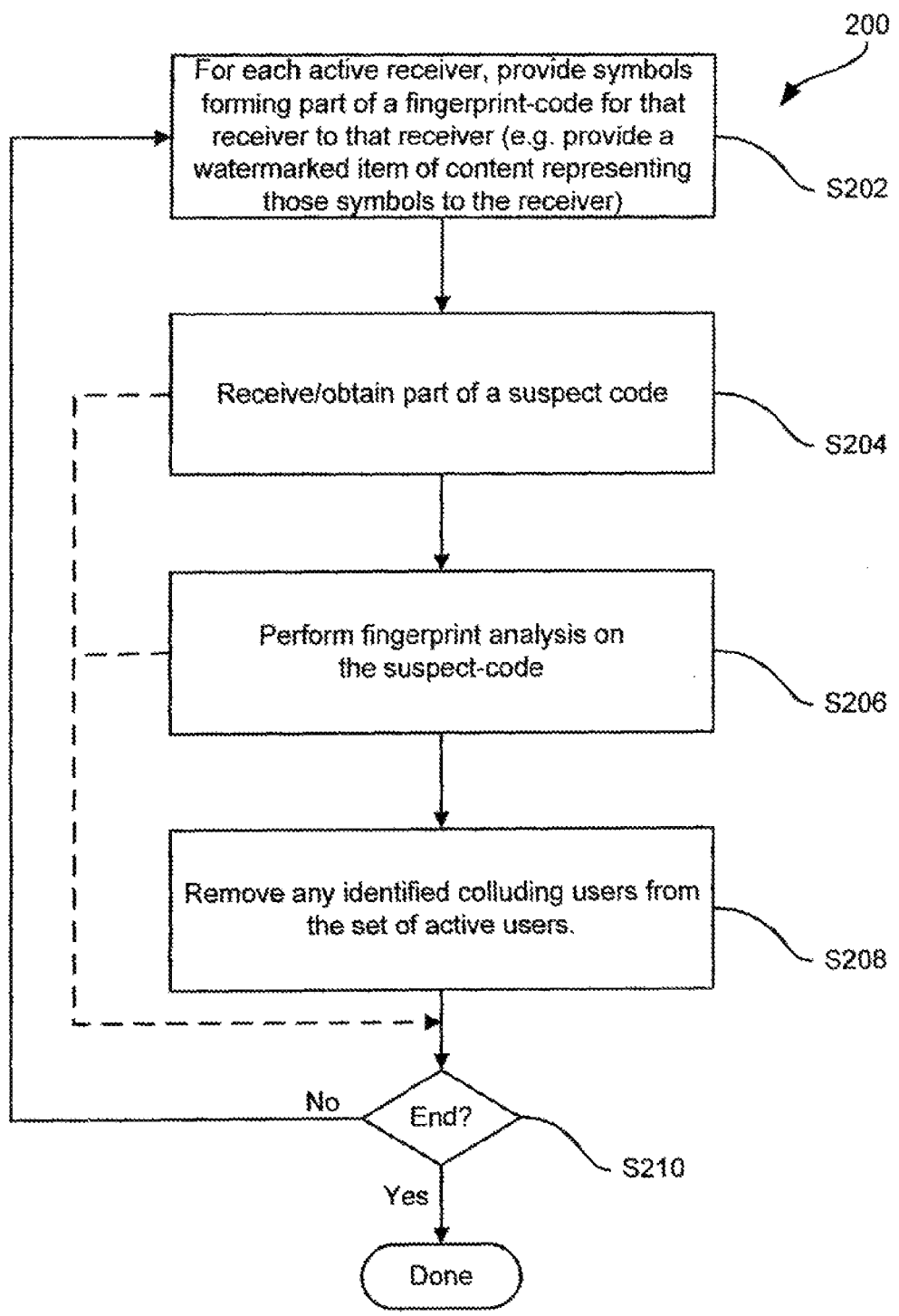
FIG. 2 is a flow-chart illustrating an overview of a method of operating the system of FIG. 1 according to an embodiment of the invention.

FIG. 2 is a flow-chart illustrating an overview of a method 200 of operating the system 150 according to an embodiment of the invention. The method comprises a series of steps S202, S204, S206, S208 and S210 which together shall be referred to as a "round" or a "stage", and which may be considered as different encoding/decoding periods or time points. As shown, the method generally involves a series of two or more rounds. At some point, at the step S210 in a current round, it is determined that the method 200 should terminate, so that no more rounds are performed.

The method 200 maintains a set of "active" receivers 104 (or "connected" receivers 104). The content distributor 100 may, for example, associate an active-flag with each receiver 104, where the active-flag for a receiver 104 indicates whether that receiver 104 is "active" or "inactive" (or "connected" or "disconnected")—these active-flags may be updated when a receiver 104 is changed from being an active receiver 104 to an inactive receiver 104. Alternatively, the content distributor 100 may maintain a list of identifiers of receivers 104 who are considered to be in the set of active receivers 104—this list may be modified by removing an identifier of a receiver 104 when that receiver 104 changes from being an active receiver 104 to an inactive receiver 104.

A receiver 104 is an active receiver if a copy of an item of content 102 should (or may) be distributed to that receiver 104; likewise, a receiver 104 is an inactive receiver 104 if an item of content 102 should (or may) not be distributed to that receiver 104. Thus, the set of active receivers is the collection of receivers 104, out of the entire population of n receivers 104, to whom items of content 102 should (or may) be distributed. As items of content 102 are to be distributed to a receiver 104 with one or more symbols of that receiver's 104 fingerprint-code embedded or contained therein, a receiver 104 may be viewed as an active receiver 104 if further symbols of the fingerprint-code for that receiver 104 should be distributed to that receiver 104; likewise, a receiver 104 may be viewed as an inactive receiver 104 if further symbols of the fingerprint-code for that receiver 104 should not be distributed to that receiver 104.

For the first round in the method 200, the set of active receivers 104 comprises all of the n receivers 104 in the population of receivers 104 of the system 150 (or at least all of those receivers 104 to whom the content distributor 100 initially wishes to provide items of content 102). However, as will be described shortly, during one or more rounds, one or more receivers 104 may be identified as being a pirate 104. When this happens, those identified pirates 104 are removed from the set of active receivers 104, i.e. the set of active receivers 104 is updated by removing any identified colluding receivers 104 from the set of active receivers 104. This may therefore be seen as de-activating receivers 104 that were initially active receivers 104. The content distributor 100 then no-longer provides items of content 102 to de-activated receivers 104 (i.e. to receivers 104 who are no longer in the set of active receivers 104).

The processing for each round is set out below.

At the step S202, each receiver 104 in the set of active receivers 104 is provided with one or more symbols as a (next) part of the fingerprint-code for the receiver 104. This part of the fingerprint-code corresponds to the current round—for the first round, the symbols provided to an active receiver 104 form a first/initial part of the fingerprint-code for that receiver 104; for subsequent rounds, the symbols provided to an active receiver 104 form a corresponding subsequent part of the same fingerprint-code for that receiver 104. Thus, the part of the fingerprint-code provided may be seen as a portion or subset of the fingerprint-code for the receiver 104 for the current round. In particular, if the symbols of the fingerprint-code that have been provided so far in previous rounds to the j-th receiver 104 are $x_{j,1}, x_{j,2}, \ldots, x_{j,r}$, then at the step S202, the j-th receiver 104 is provided with further symbols $x_{j,(r+1)}, x_{j,(r+w)}$ for some positive integer w as the next part of that fingerprint-code $\vec{x}_j$. Preferably, the number of symbols (i.e. w) is 1, as this means that the set of active receivers 104 can be updated more frequently for a given number of fingerprint-code symbols (e.g. an update for every fingerprint-code symbol position instead of an update for, say, every set of 10 fingerprint-code symbol positions)—this can thereby lead to earlier identification, and de-activation, of pirates 104. However, embodiments of the invention may make use of values of w greater than 1. The value of w may be a predetermined constant. However, in some embodiments of the invention, the value of w may change from one round to another round—this could be desirable because the watermark embedding module 108 may be able to embed a first number w1 of fingerprint symbols in a first item of content 102 during one round and may be able to embed a second number w2 of fingerprint symbols in a second item of content 102 during a subsequent round, where w1 is different from w2. This could be, for example, due to differing data sizes of the items of content 102.

As set out above, there are a number of ways in which these symbols may be provided to the receivers 104. Essentially, though, at the step S202, each receiver 104 is provided with a version of a source item of content (e.g. a watermarked item of content 110). The source item of content 102 corresponds to the current round—for example, the source item of content 102 may be the next number of video frames forming a part of a movie being provided to receivers 104—and the version of the source item of content 110 provided to a receiver 104 corresponds to the next part of the fingerprint-code for that receiver 104 (e.g. the watermarked item of content 110 has embedded therein the next w symbols for the fingerprint-code for the receiver 104). For example, in the case where w is 1, the content distributor 100 may generate two versions of a source item of content, a first version having embedded therein 0 as a fingerprint symbol and a second version having embedded therein 1 as a fingerprint symbol. If the next symbol for the fingerprint-code for a particular active receiver 104 is a 0, then the content distributor 100 provides the first version to that receiver 104; if the next symbol for the fingerprint-code for a particular active receiver 104 is a 1, then the content distributor 100 provides the second version to that receiver 104.

The content distributor 100 may use its encoding module 108 to generate an entire fingerprint-code for a receiver 104—the content distributor 100 may then store this generated fingerprint-code in the memory 126 (e.g. as part of the data 122) for later use. The content distributor 100 may then select and provide one or more symbols from that stored fingerprint-code to the corresponding receiver 104. Alternatively, the content distributor 100 may use its encoding module 108 to generate symbols for a part of a fingerprint-code for a receiver 104 as and when those symbols are needed (such as when the item of content 102 is to be provided to the receiver 104)—in this way, the content distributor 100 does not need to store an entire fingerprint-code for a receiver 104 in its memory 126. With this method, a fingerprint-code for a receiver 104 is generated in parts and "grows" as further symbols for the fingerprint-code are generated when required.

The generated symbols may then be provided to the receiver 104 in a number of ways. For example, the content distributor 100 could using its watermark encoding module 108 to embed the symbols as watermark payload data into an item of content 102 that is to be provided to receivers 104 for the current round, and then provide the watermarked item of content 110 to the receiver 104. Alternatively, the content distributor 100 could provide the symbols and the item of content 102 for the current round to the receiver 104, preferably in a secure manner such as an encrypted package, wherein the receiver 104 is arranged to embed the received symbols in the received item of content 102 (such as at the time the receiver 104 decrypts the received package or otherwise accesses the received item of content 102).

Alternatively, as mentioned above, the generation of the symbols forming a part of a fingerprint-code for a receiver 104 may be performed by the receiver 104. For example, the content distributor 100 may provide the item of content 102 to the receiver 104, preferably in a secure manner such as an encrypted package, wherein the receiver 104 is arranged to generate the fingerprint symbols and embed the received symbols in the received item of content 102 (such as at the time the receiver 104 decrypts the received package or otherwise accesses the received item of content 102).

In summary, then, the step S202 involves providing to each receiver 104 in the set of active receivers 104 one or more symbols $x_{j,i}$ as a (next) part of the fingerprint-code $\vec{x}_j$ for that receiver 104. Method for generating the particular one or more symbols $x_{j,i}$ shall be described shortly.

At the step S204, the content distributor 100 obtains one or more symbols forming a corresponding part of the suspect-code $\vec{y}$ (or a suspect fingerprint-code). In particular, if the symbols of the fingerprint-codes $\vec{x}_j$ that have been provided so far (in any previous rounds and the current round of the method 200) to currently active receivers 104 are made up of r symbols $x_{j,1}, x_{j,2}, \ldots, x_{j,r}$, then the content distributor 100 will, at the end of the step S204 have obtained a corresponding suspect-code $\vec{y}$' with symbol $y_1, y_2, \ldots, y_r$. In particular, for each symbol of the fingerprint-codes $\vec{x}_j$ that have been provided so far (in any previous rounds and the current round of the method 200) to currently active receivers 104, there is a corresponding symbol in the suspect-code. Therefore if, at the step S202 of the current round, the method 200 provided the currently active receivers 104 with w respective symbols $x_{j,(r-w+1)}, \ldots, x_{j,r}$, forming a part of the respective fingerprint-codes $\vec{x}_j$, then at the step S204 the content distributor obtains w corresponding symbols $y_{(r-w+1)}, \ldots, y_r$ as a corresponding part to add to, or extend, the suspect-code $\vec{y}$.

In particular, the content distributor 100 may receive a forgery 114 and use the analysis module 118 to decode a watermark payload from the forgery. The decoded watermark payload is a sequence of one or more fingerprint symbols that corresponds to (or is represented by) the received forgery 114. This processing is, essentially, an inverse operation to the method by which the encoding module generates a version 110 of a source item of content 102 that corresponds to a sequence of one or more fingerprint symbols. Hence, this watermark payload comprises the next symbols $y_{(r-w+1)}, \ldots, y_r$ that form the next part of the suspect-code $\vec{y}$. In this way, these symbols of the suspect-code may be obtained, or received, as a code embedded, or encoded, within the forgery 114. Moreover, the suspect-code $\vec{y}$ itself may be formed from, and grow out of, symbols obtained from a series of forgeries 114 that the content distributor 100 obtains or receives over the series of rounds.

At a step S206, the content distributor 100 uses the analysis module 118 to analyse the suspect-code $\vec{y}$. The analysis module 118 determines a likelihood (or an indication of a likelihood) that the suspect-code $\vec{y}$ has been formed using one or more of the symbols $x_{j,1}, x_{j,2}, \ldots, x_{j,r}$ that have been provided to the j-th receiver 104 so far. In other words, the analysis module 118 determines a likelihood (or an indication of a likelihood) that the j-th receiver 104 is a pirate 104, i.e. that one or more watermarked item of contents 110 provided to the j-th receiver 104 have been used, somehow, to generate one or more forgeries 114. This is done for each receiver 104 in the set of active receivers 104.

In particular, for each receiver 104 in the current set of active receivers 104, the analysis module 118 may maintain a corresponding score (represented by $S_j$ for the j-th receiver 104 in the following) that indicates a likelihood that the suspect-code $\vec{y}$ has been formed using one or more of the symbols that have been provided to that receiver 104 so far. The score, $S_j$, for the j-th receiver 104 thus represents a likelihood that the j-th receiver 104 is a colluding-receiver, where a colluding-receiver is a receiver 104 that has been provided with a version of a source item of content 110 that has been used to generate one of the forgeries 114 that have been received so far during the method 200. The analysis module 118, at the step S206, updates the score $S_j$ for each currently active receiver 104 based on the fingerprint-codes for the active receivers 104 and the suspect-code (and, in particular, on the newly obtained symbols $y_{(r-w+1)}, \ldots, y_r$ for the suspect-code). For example, if a newly obtained symbol $y_i$ matches the symbol $x_{j,i}$ of the fingerprint-code for the j-th receiver 104, then the score $S_j$ for the j-th receiver may be incremented; if the newly obtained symbol $y_i$ does not match the symbol $x_{j,i}$ of the fingerprint-code for the j-th receiver 104, then the score $S_j$ for the j-th receiver may be decremented. Particular methods for calculating and updating the scores $S_j$ shall be described shortly.

The scores $S_j$ may be stored in the memory 126 of the content distributor 100 as a part of the data 122.

The scores $S_j$ are initialized (e.g. to a value of 0) at the very beginning of the method 200 (i.e. before any of the rounds are started) and are updated/modified each round, i.e. they are not re-initialized when a new round commences or when pirates 104 that have been identified are deactivated.

At the step S208, the analysis module 118 uses these updated scores $S_j$, or likelihoods, to try to identify one or more pirates 104. In particular, for each receiver 104 in the set of active receivers 104, that receiver's 104 score $S_j$ is compared to a threshold Z and if the score $S_j$ exceeds that threshold Z, then that receiver 104 is identified as being a pirate 104. The analysis module 118 then updates the set of active receivers 104 by removing any identified pirates 104 from the set of active receivers 104—i.e. any identified pirates 104 are deactivated, or disconnected, as described above. Thus, any identified pirates 104 are not provided with further fingerprint symbols in subsequent rounds of the method 200, i.e. any identified pirates 104 are not provided with further versions of items of content 110 in subsequent rounds of the method 200.

The threshold is set such that the probability of incorrectly identifying any innocent (non-colluding) receiver 104 as actually being a pirate (i.e. the false positive probability) is at most a predetermined probability. In other words, the threshold is set such that the probability that the current suspect-code $\vec{y}$ was not actually formed using one or more symbols that have been provided to a receiver 104 who has a score exceeding the threshold is at most the predetermined probability.

At the step S210, it is determined whether or not to terminate the method 200. The method 200 may be terminated if all of the different items of content 102 that are to be distributed have been distributed. Additionally or alternatively, the method 200 may be terminated if at least a predetermined number of symbols $x_{j,i}$ have been provided to the active receivers 104 at the step S202—this predetermined number could be a calculated length l for the fingerprint-codes. Additionally or alternatively, the method 200 may be terminated if at least a predetermined number of pirates 104 have been identified at the step S206 across the rounds that have been carried out so far. Additionally or alternatively it is possible that the step S204 may fail to obtain further symbols for the suspect code (for example, a watermark decoding operation may indicate that it has failed to successfully decode a watermark payload from a forgery 114)—in this case, the processing for the current round may skip the steps S206 and S208 (as indicated by a dashed arrow connecting the steps S204 and S210 in FIG. 2) and move straight to the step S210 at which the method 200 is terminated. Other termination criteria may be applied.

If it is determined that the method is to continue, then the processing returns to the step S202. The method 200 therefore commences a next round, which is carried out based on the current set of active receivers 104 (which might have been updated at the step S208 of the previous round) and which involves providing those active receivers 104 with a further/new item of content 102 for the next round (and hence one or more further symbols as a further/next part of the fingerprint-codes for those receivers 104).

For example, the content distributor 100 may be able to embed 1 symbol $x_{j,i}$ in a single frame of video. The content distributor 100 receives corresponding frames of video as forgeries 114 produced by the coalition of pirates 104. In this case, each item of content 102 would correspond to a frame of video and the value of w would be 1, so that total amount of a receiver's fingerprint-code that has been provided to the receiver 104 grows by 1 symbol for each round of the method 200. Then, for every frame of pirate video received, the content distributor 100 carries out an analysis to try to identify one or more of the pirates 104 that are generating the pirate version—if any are identified, then they are deactivated. This leaves the coalition of pirates 104 with fewer members actually receiving copies of the video content—eventually, further pirates 104 will be identified until no more pirates 104 remain active.

As another example, the content distributor may be able to embed 2 symbols $x_{j,i}$ in a single frame of video, but may only be able to carry out a decoding operation once for every 5 frames of a received forgery 114. In this case, the each item of content 102 would correspond to a 5 frames of video and the value of w would be 10, so that total amount of a receiver's fingerprint-code that has been provided to the receiver 104 grows by 10 symbols for each round of the method 200. Then, for every 5 frames of video of a pirate version of the distributed video, the content distributor 100 carries out an analysis to try to identify one or more of the pirates 104 that are generating the pirate version—if any are identified, then they are deactivated. This leaves the coalition of pirates 104 with fewer members actually receiving copies of the video content—eventually, further pirates 104 will be identified until no more pirates 104 remain active.

It will be appreciated that if, at the step S206, no pirates 104 are identified (or it is determined that no further pirates 104 have been implicated), then the step S208 may be skipped over (as there are no additional pirates 104 to remove from the set of active receivers 104). This is illustrated in FIG. 2 by a dashed arrow from the step S206 to the step S210.

It will be appreciated that, at any stage during the method 200, one or more new receivers 104 may be added to the set of active receivers 104 (for example when a new subscriber joins a content distribution system).

Figure 3:
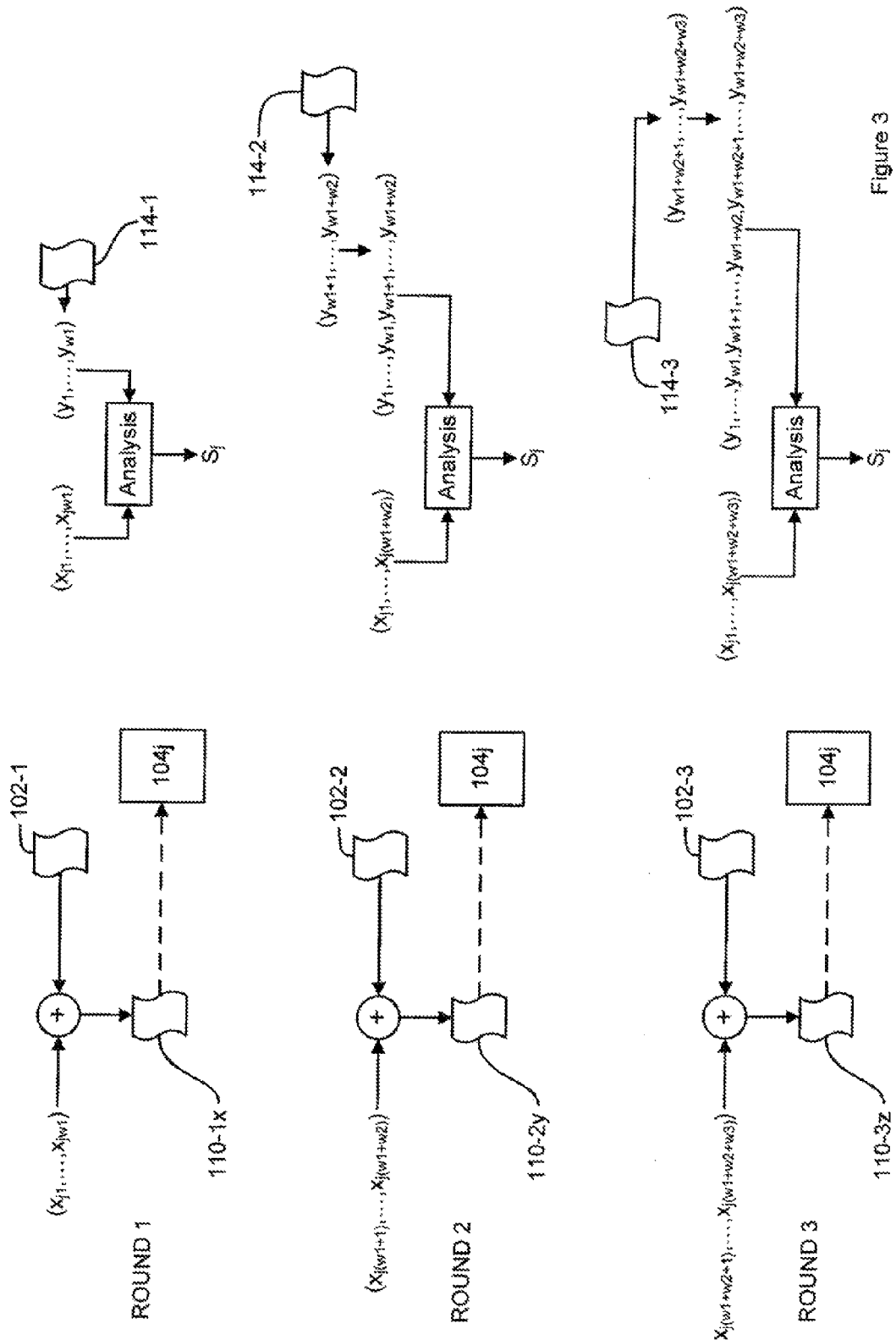
FIG. 3 schematically illustrates an example of the operation of the method illustrated in FIG. 2.

FIG. 3 schematically illustrates an example of the operation of the method 200.

At a first round, a first part of the fingerprint-code for the j-th receiver 104j is embedded as a watermark into a first item of content 102-1. This first part of the fingerprint-code $\vec{x}_j$ is made up of w1 symbols $(x_{j,1}, \ldots, x_{j,w1})$. The resulting watermarked item of content 110-1x is provided to the j-th receiver 104j, thereby providing that j-th receiver 104j with the set of w1 symbols $(x_{j,1}, \ldots, x_{j,w1})$. When the content distributor 100 obtains a forgery 114-1 of the first item of content 102-1, then corresponding symbols $(y_1, \ldots, y_{w1})$ of the suspect-code are obtained by performing a watermark decoding operation on the received forgery 114-1. The score $S_j$ for the j-th receiver 104 is then updated to indicate a likelihood that the j-th receiver 104j is a pirate and the watermarked item of content 110-1x was used to create the forgery 114-1. In other words, the score $S_j$ for the j-th receiver 104 is updated to indicate a likelihood that the suspect-code $\vec{y} = (y_1, \ldots, y_{w1})$ has been formed using one or more of the symbols $(x_{j,1}, \ldots, x_{j,w1})$ that were provided to the j-th receiver 104j. If $S_j$ exceeds a threshold, then the j-th receiver 104j is de-activated; otherwise, processing continues to the second round. The above is carried out for each currently active receiver 104.

At the second round, a second part of the fingerprint-code $\vec{x}_j$ for the j-th receiver 104j is embedded as a watermark into a second item of content 102-2. This second part of the fingerprint-code $\vec{x}_j$ is made up of w2 symbols $(x_{j,(w1+1)}, \ldots, x_{j,(w1+w2)})$. The resulting watermarked item of content 110-2y is provided to the j-th receiver 104j, thereby providing that j-th receiver 104j with the set of w2 symbols $(x_{j,(w1+1)}, \ldots, x_{j,(w1+w2)})$. When the content distributor 100 obtains a forgery 114-2 of the second item of content 102-2, then corresponding symbols $(y_{j,(w1+1)}, \ldots, y_{j,(w1+w2)})$ of the suspect-code are obtained by performing a watermark decoding operation on the received forgery 114-2. The score $S_j$ for the j-th receiver 104 is then updated to indicate a likelihood that the j-th receiver 104j is a pirate and one or more of the watermarked items of content 110-1x, 110-2y were used to create one or more of the forgeries 114-1, 114-2. In other words, the score $S_j$ for the j-th receiver 104 is updated to indicate a likelihood that the suspect-code $\vec{y} = (y_1, \ldots, y_{w1+w2})$ has been formed using one or more of the symbols $(x_{j,1}, \ldots, x_{j,(w1+w2)})$ that were provided to the j-th receiver 104j. This may involve taking the current score $S_j$ for the j-th receiver 104j and adding to that current score $S_j$ a value that results from a comparison (or processing) of the w2 received symbols $(y_{j,(w1+1)}, \ldots, y_{j,(w1+w2)})$ and the w2 symbols $(x_{j,(w1+1)}, \ldots, x_{j,(w1+w2)})$ of the fingerprint-code for the j-th receiver 104j, thereby obtaining a new score $S_j$. If $S_j$ exceeds a threshold, then the j-th receiver 104j is de-activated; otherwise, processing continues to the third round. The above is carried out for each currently active receiver 104.

At the third round, a third part of the fingerprint-code $\vec{x}_j$ for the j-th receiver 104j is embedded as a watermark into a third item of content 102-3. This third part of the fingerprint-code $\vec{x}_j$ is made up of w3 symbols $(x_{j,(w1+w2+1)}, \ldots, x_{j,(w1+w2+w3)})$. The resulting watermarked item of content 110-3z is provided to the j-th receiver 104, thereby providing that j-th receiver 104j with the set of w3 symbols $(x_{j,(w1+w2+1)}, \ldots, x_{j,(w1+w2+w3)})$. When the content distributor 100 obtains a forgery 114-3 of the third item of content 102-3, then corresponding symbols $(y_{(w1+w2+1)}, \ldots, y_{(w1+w2+w3)})$ of the suspect-code are obtained by performing a watermark decoding operation on the received forgery 114-3. The score $S_j$ for the j-th receiver 104 is then updated to indicate a likelihood that the j-th receiver 104 is a pirate and one or more of the watermarked items of content 110-1x, 110-2y, 110-3z were used to create one or more of the forgeries 114-1, 114-2, 114-3. In other words, the score $S_j$ for the j-th receiver 104j is updated to indicate a likelihood that the suspect-code $\vec{y} = (y_1, \ldots, y_{w1+w2+w3})$ has been formed using one or more of the symbols $(x_{j,i}, \ldots, x_{j,(w1+w2+w3)})$ that were provided to the j-th receiver 104j. This may involve taking the current score $S_j$ for the j-th receiver 104j and adding to that current score $S_j$ a value that results from a comparison (or processing) of the w3 received symbols $(y_{(w1+w2+1)}, \ldots, y_{(w1+w2+w3)})$ and the w3 symbols $(x_{j,(w1+w2+1)}, \ldots, x_{j,(w1+w2+w3)})$ of the fingerprint-code for the j-th receiver 104j, thereby obtaining a new score $S_j$. If $S_j$ exceeds a threshold, then the j-th receiver 104j is de-activated; otherwise, processing continues to the fourth round (not shown). The above is carried out for each currently active receiver 104.

In one embodiment of the invention, the symbols for the fingerprint-codes are generated for use in (or provision at) the step S202 as follows:

(a) Let the value c≥2 be an integer representing the maximum coalition size that the fingerprinting scheme is to cater for (i.e. the maximum number of pirates 104 who can generate a forgery 114). Let $\epsilon_1 \in (0,1)$ be a desired upper bound on the probability of incorrectly identifying a receiver 104 as being a pirate 104, i.e. a false positive probability for the fingerprinting scheme.

(b) Set $k=\lceil \log(2\eta/\epsilon_1) \rceil$. Let $d_\alpha$, r, s and g be positive constants with $r > \frac{1}{2}$ and let $d_l$, $d_z$, $d_\delta$, $d_\alpha$, r, s, g and $\eta$ be values satisfying the following four requirements:

$$d_\alpha \geq \frac{\sqrt{d_\delta}}{h(r)\sqrt{c}}$$

$$\frac{d_z}{d_\alpha} - \frac{r d_l}{d_\alpha^2} \geq 1$$

$$\frac{2 - (4/d_\delta)}{\pi} - \frac{h^{-1}(s)s}{\sqrt{d_\delta c}} \geq g$$

$$gd_l - d_z \geq \left(\eta + \frac{s}{k}\right)\sqrt{\frac{d_\delta}{s^2 c}}$$

where $h^{-1}$ is a function mapping from $(\frac{1}{2}, \infty)$ to $(0, \infty)$ according to $h^{-1}(x) = (e^x - 1 - x)/x^2$, and h is the inverse function mapping from $(0, \infty)$ to $(\frac{1}{2}, \infty)$.

(c) Set the length, l, of each receiver's 104 fingerprint-code to be $l = d_l c^2 k$. Set $\delta = 1/(d_\delta c)$. Set $Z = d_z ck$. Set $\delta' = \arcsin(\vec{\delta})$ such that $0 < \delta' < \pi/4$.

(d) For each j=1, ..., n, the i-th symbol in the fingerprint-code for the j-th receiver 104 (i.e. $x_{j,i}$) is generated as an independent random variable such that $P(x_{j,i}=1)=p_i$ and $P(x_{j,i}=0)=1-p_i$, i.e. the probability that $x_{j,i}$ assumes a first predetermined value is $p_i$ and the probability that $x_{j,i}$ assumes a second predetermined value is $1-p_i$. Here, the value $p_i$ is chosen independently from the range $[\delta, 1-\delta]$ according to a distribution with probability density function $$f(p) = \frac{1}{(\pi - 4\delta')\sqrt{p(1-p)}} \text{ for } \delta \leq p \leq (1-\delta).$$

Again, the values 1 and 0 are used here for the first and second predetermined symbol values, but it will be appreciated that other symbol values could be used instead.

With this embodiment, the analysis module 118 operates at the steps S204 and S206 as follows. As an initialisation step (not shown in FIG. 2) prior to any of the rounds of the method 200, all of the receiver's 104 scores $S_j$ are initialised to the value 0. After obtaining or receiving one or more symbols $y_i$ of the suspect-code at the step S204 in the current round, then at the step S206, if the j-th receiver 104 is an active receiver 104 then the score $S_j$ for the j-th receiver 104 is updated by adding the value $S_{j,i}$ to $S_j$, where $$S_{j,i} = \begin{cases} g_1(p_i) & \text{if } x_{j,i} = 1 \text{ and } y_i = 1 \\ g_0(p_i) & \text{if } x_{j,i} = 0 \text{ and } y_i = 1 \\ g_0(1-p_i) & \text{if } x_{j,i} = 1 \text{ and } y_i = 0 \\ g_1(1-p_i) & \text{if } x_{j,i} = 0 \text{ and } y_i = 0 \end{cases}$$

where $g_0(p) = -\sqrt{p/(1-p)}$ and $g_1(p) = \sqrt{(1-p)/p}$.

This is done for each active receiver 104 and each symbol $y_i$ of the suspect-code received at the step S204 of the current round.

The threshold used at the step S206 is the value Z, so that if, at any round of the method 200 a receiver's 104 score exceeds Z, then that receiver 104 is identified (or accused) of being a pirate 104.

The method 200 may terminate at the step S210 when l symbols of the fingerprint-code for a receiver 104 have been sent to that receiver 104 (i.e. so that the maximum length of fingerprint-code sent to a receiver 104 is l). However, at the step S210, the method 200 may terminate when c pirates 104 have been identified. Hence, it is possible to terminate the method 200 without actually having to distribute l fingerprint symbols to the receivers 104.

This embodiment essentially takes the above TAR7 static probabilistic fingerprinting scheme and adapts it so as to form a more dynamic probabilistic fingerprinting scheme—the similarity between the various equations and conditions is apparent, except that a number of modifications are present in order to be able to make the transition from TAR7's static nature to the more dynamic nature of embodiments of the invention.

With this embodiment, the probability of incorrectly identifying a receiver 104 as being a pirate (i.e. the false positive probability) is at most $\epsilon_1$, whilst the probability of not managing to identify all pirates 104 (i.e. a second type of false negative probability, stronger than the above first type of false positive probability) is again at most $\epsilon_2$. This applies when the value of w is 1, i.e. when a single symbol is provided/encoded at the step S202 and a single corresponding symbol is received at the step S204 for each round of the method 200. For other values of w, the false positive probability lies between $\epsilon_1$ and the corresponding false positive probability for the TAR7 scheme mentioned above (which can be half the size of $\epsilon_1$ of the present embodiment). The mathematical proofs of these false positive and false negative results are provided in chapters 9.3 and 9.4 of the appendix at the end of this description (which form part of a thesis "*Collusion-resistant traitor tracing schemes*" by Thijs Martinus Maria Laarhoven, to be submitted to the Department of Mathematics and Computer Science, University of Technology, Eindhoven).

As mentioned above, this embodiment essentially takes the above TAR7 static probabilistic fingerprinting scheme and adapts it so as to form a more dynamic probabilistic fingerprinting scheme. It will be appreciated that, in embodiments of the invention, any of the other Tardos-based static probabilistic fingerprinting schemes TAR1-TAR6 (or indeed any others) could be used instead of TAR7 as the basis for forming a more dynamic probabilistic fingerprinting scheme, with their various parameters/settings/thresholds being modified so as to achieve the desired false positive and false negative probabilities in the dynamic scheme. Indeed, other non-Tardos-based static probabilistic fingerprinting schemes, such as the BER1 scheme, could be used in embodiments of the invention as the basis for forming a more dynamic probabilistic fingerprinting scheme. Additionally, embodiments of the invention may make use of binary or non-binary symbols alphabets (as discussed above, for example, with reference to the TAR2 scheme).

The threshold value Z used at the step S208 may remain constant throughout the processing of the method 200. However, in some embodiments, the value Z may be updated to cater for the fact that one or more pirates 104 have been identified. For example, when one or more pirates 104 are identified and de-activated, the threshold may be decreased to account for the fact that the set of active receivers 104 is now reduced.

One observation of note is that the above-mentioned embodiments of the invention, and the previously-mentioned static probabilistic fingerprinting schemes, use the value c (the maximum coalition size that the fingerprinting scheme is to cater for) in order to set up the various parameters and to generate the symbols of the fingerprint-codes. For example, in the TAR7 static fingerprinting scheme and in the above-described embodiment of the invention, each symbol $x_{j,i}$ is taken from a probability distribution with a probability density function that is dependent on the value of $p_i$, which is dependent on the value of $\delta'$, which is dependent on the value of $\delta$, which is dependent on the value of c.

In preferred embodiments of the invention, each symbol for each fingerprint-code is generated independent of an expected number of colluding-receivers (i.e. independent of the value of c).

In order to remove the dependency on c, the above-mentioned embodiment of the invention (which is based on the TAR7 static probabilistic scheme) may be modified so that the value of each $p_i$ is chosen independently from the range (0,1) according to a distribution with probability density function $$f(p) = \frac{1}{\pi\sqrt{p(1-p)}} \text{ for } 0 < p < 1.$$

This removes the dependency of each symbol $x_{j,i}$ on the value of c. The same (or similar) can be done for other embodiments of the invention, such as embodiments of the invention which are based on the other Tardos-style static fingerprinting schemes TAR1-TAR6. A similar approach can be used for embodiments of the invention which are based on BER1 scheme or that are based on other types of static fingerprinting schemes.

With such schemes that are independent of c, the method of updating the score $S_j$ for the active receivers 104 should be modified to account for the fact that the symbols of the fingerprint-codes provided to the receivers 104 are now taken from a different distribution (that is not dependent on c). For example, in the Tardos-based schemes, each $p_i$ was taken from the range $[\delta, 1-\delta]$ for some value $\delta$ (dependent on c) whereas now each $p_i$ is taken from the range (0,1). Thus, a value for $p_i$ may be valid for a particular collusion size c, i.e. whilst having been taken from the range (0,1), $p_i$ happens to lie in the range $[\delta, 1-\delta]$ appropriate to that collusion size c. Conversely, a value for $p_i$ may be invalid for a particular collusion size c, i.e. having been taken from the range (0,1), the value of $p_i$ happens to lie outside of the range $[\delta, 1-\delta]$ appropriate to that collusion size c. In this way, the symbols generated for the i-th position in the fingerprint-codes provided to the receivers 104 may be valid for certain collusion sizes and may be invalid for other collusion sizes. In the above example, symbols generated for the i-th position of the fingerprint-codes are valid for a collusion-size of c if $p_i$ lies in the range $\delta \leq p_i (1-\delta)$, where $\delta = 1/d_\delta c$); otherwise, they are invalid. However, for other embodiments of the invention, it will be appreciated that other criteria will apply as to when symbols for the i-th position of the fingerprint-codes are valid or are not valid for a particular collusion-size of c.

Therefore, in preferred embodiments of the invention, the symbols for the fingerprint-codes for the step S202 are generated independent of any collusion-size c (as set out above). The step S206 involves maintaining, for each receiver 104j and for one or more expected (maximum) collusion sizes c1, c2, . . . , ct, a corresponding score $S'_{j,c1}, S'_{j,c2}, \ldots, S'_{j,ct}$. The score $S'_{j,c}$ indicates a likelihood that the j-th receiver 104 is a colluding-receiver under the assumption that the number of colluding-receivers is of size (at most) c. For each of the collusion-sizes c1, c2, . . . , ct, there is a respective threshold $Z_{c1}, Z_{c2}, \ldots, Z_{ct}$ corresponding to the collusion-size. These respective thresholds are set as discussed above to ensure that a receiver 104 that is not a colluding-receiver 104 will only have a score (i.e. one or more of $S'_{j,c1}, S'_{j,c2}, \ldots, S'_{j,ct}$) that exceeds its corresponding threshold with at most the predetermined (desired) false positive probability $\epsilon_1$. The step S206 comprises comparing each of the scores $S'_{j,1}, S'_{j,2}, \ldots, S'_{j,ct}$ with the corresponding threshold $Z_{c1}, Z_{c2}, \ldots, Z_{ct}$ and identifying the j-th receiver 104 as a colluding-user if one or more of the scores $S'_{j,1}, S'_{j,2}, \ldots, S'_{j,ct}$ exceeds the corresponding threshold $Z_{c1}, Z_{c2}, \ldots, Z_{ct}$.

To cater for the fact that the generation of the fingerprint-symbols for the i-th position in the fingerprint-codes may not be valid for a particular collusion-size, the step S206 only updates a score $S'_{j,c}$ based on a received i-th symbol $y_i$ of the suspect-code and the i-th fingerprint-symbol $x_{j,i}$ if symbols at the i-th position of the fingerprint-codes are valid for that collusion size c. In other words, updating the score $S'_{j,c}$ for a collusion-size c comprises disregarding a symbol $y_i$ obtained for the i-th position of the suspect-code if symbols generated for the i-th position of the fingerprint-codes are invalid for that collusion-size c.

In this way, a plurality of fingerprinting schemes (catering for different collusion sizes) may effectively be run in parallel—however, the same fingerprint-codes are supplied to the receivers 104. In other words, these embodiments enable coalitions of arbitrary size to be catered for, this being done without having to generate and supply to receivers 104 different fingerprint-codes that are specifically intended for respectively different collusion-sizes.

Figure 4:
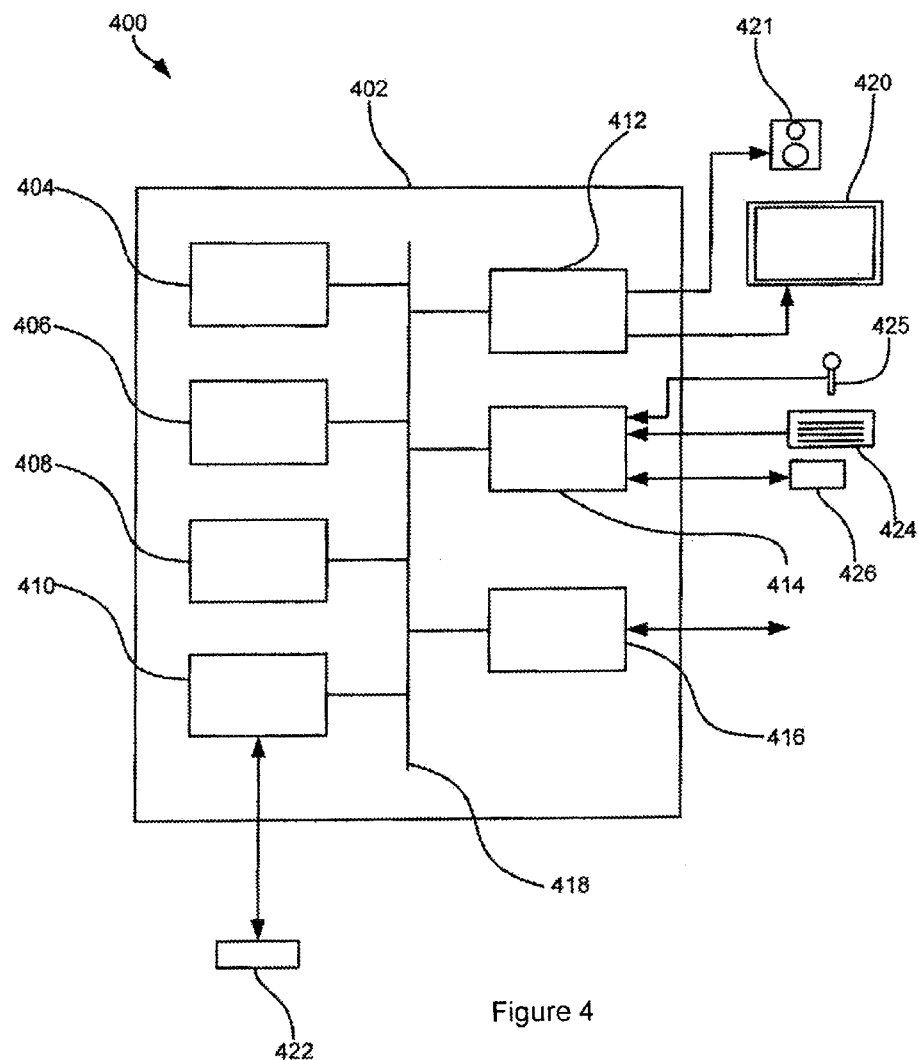
FIG. 4 schematically illustrates an example computer system.

FIG. 4 schematically illustrates an example computer system 400 which may be used to form a data processing system forming the whole or a part of the content distributor 100 and/or each receiver 104.

The system 400 comprises a computer 402. The computer 402 comprises: a storage medium 404, a memory 406, a processor 408, a storage medium interface 410, an output interface 412, an input interface 414 and a network interface 416, which are all linked together over one or more communication buses 418.

The storage medium 404 may be any form of non-volatile data storage device such as one or more of a hard disk drive, a magnetic disc, an optical disc, a ROM, etc. The storage medium 404 may store an operating system for the processor 408 to execute in order for the computer 402 to function. The storage medium 404 may also store one or more computer programs (or software or instructions or code) that form part of an embodiment of the invention.

The memory 406 may be any random access memory (storage unit or volatile storage medium) suitable for storing data and/or computer programs (or software or instructions or code) that form part of an embodiment of the invention.

The processor 408 may be any data processing unit suitable for executing one or more computer programs (such as those stored on the storage medium 404 and/or in the memory 406) which have instructions that, when executed by the processor 408, cause the processor 408 to carry out a method according to an embodiment of the invention and configure the system 400 to be a system according to an embodiment of the invention. The processor 408 may comprise a single data processing unit or multiple data processing units operating in parallel, in cooperation with each other, or independently of each other. The processor 408, in carrying out data processing operations for embodiments of the invention, may store data to and/or read data from the storage medium 404 and/or the memory 406.

The storage medium interface 410 may be any unit for providing an interface to a data storage device 422 external to, or removable from, the computer 402. The data storage device 422 may be, for example, one or more of an optical disc, a magnetic disc, a solid-state-storage device, etc. The storage medium interface 410 may therefore read data from, or write data to, the data storage device 422 in accordance with one or more commands that it receives from the processor 408.

The input interface 414 is arranged to receive one or more inputs to the system 400. For example, the input may comprise input received from a user, or operator, of the system 400; the input may comprise input received from a device external to or forming part of the system 400. A user may provide input via one or more input devices of the system 400, such as a mouse (or other pointing device) 426 and/or a keyboard 424, that are connected to, or in communication with, the input interface 414. However, it will be appreciated that the user may provide input to the computer 402 via one or more additional or alternative input devices. The system may comprise a microphone 425 (or other audio transceiver or audio input device) connected to, or in communication with, the input interface 414, the microphone 425 being capable of providing a signal to the input interface 414 that represents audio data (or an audio signal). The computer 402 may store the input received from the/each input device 424, 425, 426 via the input interface 414 in the memory 406 for the processor 408 to subsequently access and process, or may pass it straight to the processor 408, so that the processor 408 can respond to the input accordingly.

The output interface 412 may be arranged to provide a graphical/visual output to a user, or operator, of the system 400. As such, the processor 408 may be arranged to instruct the output interface 412 to form an image/video signal representing a desired graphical output, and to provide this signal to a monitor (or screen or display unit) 420 of the system 400 that is connected to the output interface 412. Additionally, or alternatively, the output interface 412 may be arranged to provide an audio output to a user, or operator, of the system 400. As such, the processor 408 may be arranged to instruct the output interface 412 to form an audio signal representing a desired audio output, and to provide this signal to one or more speakers 421 of the system 400 that is/are connected to the output interface 412.

For example, when the system 400 is a receiver 104, the output interface 412 may output to an operator a representation of a watermarked item of content 110 that has been received by the receiver 104.

Finally, the network interface 416 provides functionality for the computer 402 to download data from and/or upload data to one or more data communication networks (such as the Internet or a local area network).

It will be appreciated that the architecture of the system 400 illustrated in FIG. 4 and described above is merely exemplary and that other computer systems 400 with different architectures and additional and/or alternative components may be used in embodiments of the invention, and that not all of the components mentioned above may be present. For example, some or all of the input devices (e.g. the keyboard 424, the microphone 425 and the mouse 426) and/or the output devices (e.g. the monitor 420 and the speaker 421) may be integral with the computer 402, whilst others may be peripheral devices communicatively coupled to the computer 402 (e.g. via a cable and/or wirelessly).

It will be appreciated that embodiments of the invention may be implemented using a variety of different information processing systems. In particular, although FIG. 4 and the discussion thereof provide an exemplary computing architecture, this is presented merely to provide a useful reference in discussing various aspects of the invention. Of course, the description of the architecture has been simplified for purposes of discussion, and it is just one of many different types of architecture that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the system 400 may be any type of computer system, such as one or more of: a games console, a set-top box, a personal computer system, a mainframe, a minicomputer, a server, a workstation, a notepad, a personal digital assistant, and a mobile telephone.

It will be appreciated that, insofar as embodiments of the invention are implemented by a computer program, then a storage medium and a transmission medium carrying the computer program form aspects of the invention. The computer program may have one or more program instructions, or program code, which, when executed by a computer (or a processor) carries out an embodiment of the invention. The term "program," as used herein, may be a sequence of instructions designed for execution on a computer system, and may include a subroutine, a function, a procedure, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

ANNEX

The following sections provide various mathematical analysis and proofs in support of the above-mentioned embodiments. In these sections:

Reference is made to "code matrix X", which is the matrix having n rows and l columns (n being the number of receivers 104 and l being the length of a fingerprint-code for a receiver 104), for which the j-th row is the fingerprint-code $\vec{x}_j$ for the j-th receiver 104. Thus, the element at the j-th row and i-th column of code matrix X is $x_{j,i}$.

The symbol U is used to represent the whole set of receivers 104.

The symbol σ is used to refer to an accusation algorithm (relevant to the particular fingerprinting-scheme being referred to at the time).

[BT08] refers to document "*Improved versions of Tardos' fingerprinting scheme*" (Oded Blayer et al., Des. Codes Cryptography, 48, pages 79-103, 2008).

[SKC08] refers to document "*Symmetric Tardos Fingerprinting Codes for Arbitrary Alphabet Sizes*" (Boris Skoric et al., Des. Code Cryptography, 46(2), 2008, pages 137-166).

The invention claimed is:

1. A fingerprinting method implemented by one or more computer processors, the method comprising,
   for each receiver in a set of receivers initializing a corresponding score that indicates a likelihood that the receiver is a colluding-receiver; and
   for each round in a series of rounds:
   providing to each receiver in the set of receivers a version of a source item of content, the source item of content corresponding to the round, wherein for the round there is a corresponding part of a fingerprint-code for the receiver, the part comprising one or more symbols, wherein the version provided to the receiver represents those one or more symbols;
   obtaining, from a suspect item of content one or more corresponding symbols as a corresponding part of a suspect-code;
   for each receiver in the set of receivers, updating the corresponding score that indicates a likelihood that the receiver is a colluding-receiver, wherein a colluding-receiver is a receiver that has been provided with a version of a source item of content that has been used to generate a suspect item of content, wherein said updating is based on the fingerprint-code for the receiver and the suspect-code wherein, when the round is not a first round, said updating is based on a value of the corresponding score in a previous round;
   for each receiver in the set of receivers, when the score for the receiver exceeds a threshold, updating the set of receivers by removing the receiver from the set of receivers so that the receiver is not provided with a further version of a source item of content, wherein the threshold is set such that the probability that a receiver that is not a colluding-receiver has a score exceeding the threshold is at most a predetermined probability.

2. The method of claim 1, wherein each symbol assumes a symbol value from a predetermined set of symbol values; and
   wherein the i-th symbol of the fingerprint-code for a receiver is generated as an independent random variable such that, for each symbol value in the predetermined set of symbol values, the probability that the i-th symbol of the fingerprint-code for a receiver assumes that symbol value is a corresponding probability value set for the i-th symbol position of the fingerprint-codes for the receivers.

3. The method of claim 2, wherein the probability that the i-th symbol of a fingerprint-code for a receiver assumes a first symbol value is $p_i$; and the probability that the i-th symbol of a fingerprint-code for a receiver assumes a second symbol value is $1-p_i$, wherein when an obtained symbol corresponds to the i-th symbol position in the fingerprint-codes then updating the score for a receiver comprises incrementing the score by $\sqrt{(1-p_i)/p_i}$ if that obtained symbol is the first symbol value and the i-th symbol in the fingerprint-code for that receiver is the first symbol value and decrementing the score by $\sqrt{p_i/(1-p_i)}$ if that obtained symbol is the first symbol value and the i-th symbol in the fingerprint-code for that receiver is the second symbol value.

4. The method of claim 3, wherein when an obtained symbol corresponds to the i-th symbol position in the fingerprint-codes then updating the score for a receiver comprises incrementing the score by $\sqrt{p_i/(1-p_i)}$ if that obtained symbol is the second symbol value and the i-th symbol in the fingerprint-code for that receiver is the second symbol value and decrementing the score by $\sqrt{(1-p_i)/p_i}$ if that obtained symbol is the second symbol value and the i-th symbol in the fingerprint-code for that receiver is the first symbol value.

5. The method of claim 2, wherein the probability that the i-th symbol of a fingerprint-code for a receiver assumes a first symbol value is $p_i$ and the probability that the i-th symbol of a fingerprint-code for a receiver assumes a second symbol value is $1-p_i$, wherein the value $p_i$ is generated as an independent random variable having a probability density function of:

$$f(p) = \frac{1}{(\pi - 4\delta')\sqrt{p(1-p)}} \text{ for } \delta \le p \le (1-\delta)$$

wherein $\delta'=\arcsin(\sqrt{\delta})$ such that $0<\delta'<\pi/4$, $\delta=1/(\delta_c c)$, c is an expected number of colluding-receivers, and $\delta_c$ is a predetermined constant.

6. The method of claim 2, wherein the probability that the i-th symbol of a fingerprint-code for a receiver assumes a first symbol value is $p_i$ and the probability that the i-th symbol of a fingerprint-code for a receiver assumes a second symbol value is $1-p_i$, wherein the value $p_i$ is generated as an independent random variable having a probability density function of:

$$f(p) = \frac{1}{\pi\sqrt{p(1-p)}} \text{ for } 0 < p < 1.$$

7. The method of claim 6, wherein symbols for the i-th position of the fingerprint-codes are invalid for a collusion-size of c when $p_i$ lies outside of the range $[\delta, 1-\delta]$, where $\delta=1/(\delta_c c)$ and $\delta_c$ is a predetermined constant.

8. The method of claim 1, wherein when an obtained symbol corresponds to the i-th symbol position in the fingerprint-codes then updating the score for a receiver comprises incrementing the score if that obtained symbol matches the i-th symbol in the fingerprint-code for that receiver and decrementing the score if that obtained symbol does not match the i-th symbol in the fingerprint-code for that receiver.

9. The method of claim 1, wherein each symbol assumes a symbol value from a predetermined set of symbol values, the predetermined set comprising only two symbol values.

10. The method of claim 1, in which each symbol for each fingerprint-code is generated independent of an expected number of colluding-receivers.

11. The method of claim 10, wherein updating a score for a receiver comprises, for one or more collusion-sizes, updating a score for the receiver for that collusion-size that indicates a likelihood that the receiver is a colluding-receiver under the assumption that the number of colluding-receivers is that collusion-size;
   wherein the method comprises, for each receiver in the set of receivers, when a corresponding score for that receiver exceeds a threshold corresponding to the collusion-size for that score, updating the set of receivers by removing that receiver from the set of receivers, wherein the thresholds are set such that the probability that a receiver that is not a colluding-receiver has a score exceeding the corresponding threshold is at most the predetermined probability.

12. The method of claim 11, wherein updating the score for a collusion-size comprises disregarding a symbol obtained for the i-th position of the suspect-code when symbols generated for the i-th position of the fingerprint-codes are invalid for that collusion-size.

13. The method of claim 12, in which symbols generated for the i-th position of the fingerprint-codes are invalid for a collusion-size c when the generation of symbols for the i-th position of the fingerprint-codes independent of an expected number of colluding-receivers used a parameter value that would be inapplicable when generating symbols for the i-th position of fingerprint-codes dependent on an expected collusion-size of c.

14. The method of claim 1, in which either:
(a) the method comprises generating a fingerprint-code for a receiver in advance of the series of rounds; or
(b) said providing comprises generating the part of the fingerprint-code for the receiver.

15. The method of claim 1, in which the version of the source item of content provided to a receiver is formed by watermarking a copy of the source item of content with the part of the fingerprint-code for the receiver.

16. An apparatus comprising one or more computer processors configured to carry out a fingerprinting operation, the one or more processors being configured to, for each receiver in a set of receivers initialize a corresponding score that indicates a likelihood that the receiver is a colluding-receiver; and for each round in a series of rounds:

provide to each receiver in the set of receivers a version of a source item of content, the source item of content corresponding to the round, wherein for the round there is a corresponding part of a fingerprint-code for the receiver, the part comprising one or more symbols, wherein the version provided to the receiver represents those one or more symbols;

obtain, from a suspect item of content one or more corresponding symbols as a corresponding part of a suspect-code;

for each receiver in the set of receivers, update the corresponding score that indicates a likelihood that the receiver is a colluding-receiver, wherein a colluding-receiver is a receiver that has been provided with a version of a source item of content that has been used to generate a suspect item of content, wherein said updating is based on the fingerprint-code for the receiver and the suspect-code wherein, when the round is not a first round, said updating is based on a value of the corresponding score in a previous round;

for each receiver in the set of receivers, when the score for the receiver exceeds a threshold, updating the set of receivers by removing the receiver from the set of receivers so that the receiver is not provided with a further version of a source item of content, wherein the threshold is set such that the probability that a receiver that is not a colluding-receiver has a score exceeding the threshold is at most a predetermined probability.

17. A non-transitory computer readable medium having instructions recorded thereon which, when executed by a processor, causes the processor to carry out a fingerprinting operation comprising, for each receiver in a set of receivers initializing a corresponding score that indicates a likelihood that the receiver is a colluding-receiver; and for each round in a series of rounds:

providing to each receiver in the set of receivers a version of a source item of content, the source item of content corresponding to the round, wherein for the round there is a corresponding part of a fingerprint-code for the receiver, the part comprising one or more symbols, wherein the version provided to the receiver represents those one or more symbols;

obtaining, from a suspect item of content one or more corresponding symbols as a corresponding part of a suspect-code;

for each receiver in the set of receivers, updating the corresponding score that indicates a likelihood that the receiver is a colluding-receiver, wherein a colluding-receiver is a receiver that has been provided with a version of a source item of content that has been used to generate a suspect item of content, wherein said updating is based on the fingerprint-code for the receiver and the suspect-code wherein, when the round is not a first round, said updating is based on a value of the corresponding score in a previous round;

for each receiver in the set of receivers, when the score for the receiver exceeds a threshold, updating the set of receivers by removing the receiver from the set of receivers so that the receiver is not provided with a further version of a source item of content, wherein the threshold is set such that the probability that a receiver that is not a colluding-receiver has a score exceeding the threshold is at most a predetermined probability.

\* \* \* \* \*